United States Patent [19]
Ozawa et al.

[11] Patent Number: 5,444,336
[45] Date of Patent: Aug. 22, 1995

[54] AN INVERTER DRIVEN LAMP ARRANGEMENT HAVING A CURRENT DETECTION CIRCUITRY COUPLED TO A RESONANT OUTPUT CIRCUIT

[75] Inventors: Masataka Ozawa, Takarazuka; Shigeru Horii, Takatsuki; Koji Miyazaki, Yawata; Atsuo Waki; Takayuki Kamitani, both of Osaka; Nobuhisa Yoshikawa, Sakai; Kazuhiko Ito, Hirakata; Masayoshi Gyoten, Takatsuki; Takeshi Saito, Amagasaki, all of Japan

[73] Assignee: Matsushita Electric Industrial Co., Ltd., Osaka, Japan

[21] Appl. No.: 47,882

[22] Filed: Apr. 15, 1993

Related U.S. Application Data

[63] Continuation of Ser. No. 884,629, May 15, 1992, abandoned, which is a continuation of Ser. No. 698,757, May 10, 1991, abandoned.

[30] Foreign Application Priority Data

May 10, 1990 [JP] Japan .................................. 2-120951
May 10, 1990 [JP] Japan .................................. 2-120952
Mar. 29, 1991 [JP] Japan .................................. 3-065816

[51] Int. Cl.$^6$ ............................................ H05B 41/36
[52] U.S. Cl. ................................ 315/307; 315/209 R; 315/308; 315/DIG. 7; 315/DIG.5
[58] Field of Search .................... 315/208, 209 R, 307, 315/308, DIG. 5, DIG. 7

[56] References Cited

U.S. PATENT DOCUMENTS

| | | | |
|---|---|---|---|
| 3,611,021 | 10/1971 | Wallace | 315/307 |
| 4,791,338 | 12/1988 | Dean et al. | 315/307 |
| 4,914,558 | 4/1990 | Flickinger | 315/DIG. 7 |
| 4,935,672 | 6/1990 | Lammers et al. | 315/DIG. 7 |
| 5,083,065 | 1/1992 | Sakata et al. | 315/307 |

FOREIGN PATENT DOCUMENTS

| | | |
|---|---|---|
| 350104 | 1/1991 | European Pat. Off. . |
| 408121 | 1/1991 | European Pat. Off. . |
| 413991 | 2/1991 | European Pat. Off. . |
| 415496 | 3/1991 | European Pat. Off. . |
| 415496 | 3/1991 | European Pat. Off. . |
| 2648000 | 12/1990 | France . |
| 4009267 | 9/1990 | Germany . |
| 0210697 | 1/1990 | Japan . |
| 2136342 | 5/1990 | Japan . |
| 2136343 | 5/1990 | Japan . |
| 2215090 | 8/1990 | Japan . |
| 2215091 | 8/1990 | Japan . |
| 2215091 | 8/1990 | Japan . |
| 2233796 | 1/1991 | United Kingdom . |

Primary Examiner—Robert J. Pascal
Assistant Examiner—Michael B. Shingleton
Attorney, Agent, or Firm—Panitch Schwarze Jacobs & Nadel

[57] ABSTRACT

The present invention relates to an inverter driven lamp arrangement. The arrangement provides for the sensing of both lamp voltage and current. The arrangement also provides for a large current during times of low voltage and a small current during times of high voltage. The sensing of lamp current is done by a current detector that is connected to a resonance circuit whose output is applied in signal form to a lamp start control circuit. The resonant circuit is a series connected resonant circuit composed of a choke coil and a first capacitor. This series connected arrangement is further connected in series with a second non-resonant capacitor. Also the arrangement includes circuitry to gradually reduce the frequency of the inverter just after the lamp starts.

19 Claims, 14 Drawing Sheets

AN INVERTER DRIVEN LAMP ARRANGEMENT HAVING A CURRENT DETECTION CIRCUITRY COUPLED TO A RESONANT OUTPUT CIRCUIT

This application is a continuation of Serial No. 07-884,629 filed May 15, 1992 now abandoned which is a continuation of serial No. 07-698,757 filed May 10, 1991 now abandoned.

BACKGROUND OF THE INVENTION

1. Field of the Invention

The present invention relates to an apparatus for operating a discharge lamp, and more particularly to an apparatus for operating a discharge lamp which can regulate the initiation and lighting of the discharge lamp, wherein the discharge lamp includes such as a mercury lamp, a sodium lamp and a metal halide lamp.

2. Description of the Prior Art

In the discharge lamps such as metal halide lamps a detrimental cataphoresis and/or acoustic resonance occur during the operation. Japanese Laid-Open Patent Publication No. 2-10697 proposes a method for eliminating or reducing such detrimental effects, according to which a relatively high voltage is applied between the pair of electrodes of the discharge lamp so as to agitate molecules confined in the discharge lamp, and a rectangular shape wave current in a predetermined range of amplitude is supplied to the electrodes at given repeated intervals. This prior art also teaches that the directions of the rectangular shape wave current to the pair of electrodes may alternately changed periodically.

A major disadvantage of this prior art method is that the equipment becomes complicated, thereby resulting in difficult handling and an increased production cost. The device for putting these objectives into practice becomes complicated as is evident as shown in the publication.

SUMMARY OF THE INVENTION

The apparatus of this invention, which overcomes the above-discussed and numerous other disadvantages of the prior art, comprises a d.c. power source, an inverter driven from the d.c. power source so as to be oscillated at a predetermined frequency or a duty ratio, a discharge lamp connected to the inverter, a lamp voltage detecting means for detecting a voltage applied to the discharge lamp, a lamp start control means for regulating the inverter during a period of times from the initiation of discharge up to the stable lighting by changing the oscillating frequency or the duty ratio, thereby allowing a large current to flow through the discharge lamp when a voltage applied to the discharge lamp is low, and flowing a small current therethrough when the lamp voltage is high.

In a preferred embodiment, the lamp start control means regulates the inverter when the lamp voltage rises above a predetermined value so as to stop the current from flowing through the discharge lamp, and to step up the current to a predetermined level when the voltage drops below the predetermined value.

In a preferred embodiment, the start control means comprises a lamp current arithmetic means whose output is applied to the inverter in response to the reception of the output of the lamp voltage detecting means, and a bias means for applying a bias voltage to the lamp current arithmetic means, wherein the lamp current arithmetic means progressively lowers a voltage level at which a signal output is generated with increases in the lamp voltage when the lamp voltage stays within a predetermined range, maintains a constant voltage level when it is above a predetermined upper limit of the range, and make the voltage level nought.

In a preferred embodiment, the lamp start control means comprises a d.c. current detecting means for detecting the lamp current, and a comparator comparing between the output of the d.c. current detecting means and the added output of the lamp current arithmetic means and the bias means, the output of the comparator regulating the inverter.

In a preferred embodiment, the lamp start control means comprises a time constant shift means which is operated when the lamp voltage exceeds a predetermined limit within the predetermined range so as to change a time constant required to reduce the output current determined by the lamp current arithmetic means.

In a preferred embodiment, the lamp start control means comprises a bias current circuit whereby the lamp current by the inverter is controlled to below the predetermined value.

In a preferred embodiment, the lamp start control means comprises a lamp instantaneous current value detecting means for generating a signal when the lamp instantaneous current value exceeds a predetermined value, the lamp instantaneous current value detecting means regulating the inverter so as to allow the same to oscillate the lamp current at a predetermined frequency.

In a preferred embodiment, the lamp start control means comprises a start voltage timer means which stops the inverter from oscillation when the lamp voltage drops below a predetermined value over a period of time from the initiation of discharge up to the stabilized lighting.

In a preferred embodiment, the lamp start control means comprises a starting initial current set-up means which regulates the inverter so that the initial lamp current generated reaches a larger value immediately after the initiation or reinitiation of discharge as compared with a lamp current at which the lighting is stabilized.

In a preferred embodiment, the lamp start control means comprises an after-extinct period detecting means for detecting a period of time lapsing after extinction, wherein the starting initial current set-up means steps up the initial lamp current in proportion to the length of the after-extinct period detected by the after-extinct period.

In a preferred embodiment, the lamp start control means comprises a minimum lamp voltage detecting means for detecting a minimum voltage after the initiation or reinitiation of discharge, and a lamp current shift means for changing the lamp current so as to raise the electric power supplied to the discharge lamp more intensively in accordance with the lowering degree of the minimum lamp voltage detected by the minimum lamp voltage detecting means.

In a preferred embodiment, the lamp current shift means prolongs the period of time for which the lamp current is supplied to the discharge lamp in accordance with the lowering degree of the minimum lamp voltage.

In a preferred embodiment, the lamp current shift means prolongs a time constant required to reduce the lamp current in accordance with the lowering degree of the minimum lamp voltage.

In a preferred embodiment, the lamp current shift means continuously shifts the time constant over the period of time for which the minimum lamp voltage lowers.

In a preferred embodiment, the lamp current shift means prolongs a period of time for flowing a maximum lamp current in accordance with the lowering degree of the minimum lamp voltage.

According to another aspect of the present invention, the apparatus for operating a discharge lamp comprises a d.c. power source, an inverter driven from the d.c. power source so as to be oscillated, an resonance circuit comprising a series connection including a choke coil connected to the inverter and a capacitor, a discharge lamp connected to the junction of the choke coil and a first capacitor, a lamp characteristics detecting means for detecting a lamp voltage or a lamp current or both, and a lamp start control means for changing the oscillating frequency or duty ratio of the inverter in response to the output signal from the lamp characteristics detecting means, thereby stabilizing the lighting of the discharge lamp.

In a preferred embodiment, the oscillating circuit comprises a second capacitor connected in series with the choke coil and the first capacitor connected in series, and wherein the discharge lamp is connected to the junction of the choke coil and the second capacitor, the first capacitor having a larger capacitance than the second capacitor.

In a preferred embodiment, the lamp characteristics detecting means is a lamp voltage detecting means whereby the lamp voltage is detected.

In a preferred embodiment, the inverter is oscillated at a relatively low frequency at an initial stage when the d.c. power source is turned on, and the resulting low frequency voltage has a relatively high frequency oscillating voltage overlapped by the oscillating circuit.

In a preferred embodiment, the lamp start control means raises the oscillating frequency of the inverter so as to enable the resonance circuit to generate a high frequency voltage when the lamp voltage detecting means detects an oscillating voltage having a higher frequency than a predetermined frequency.

In a preferred embodiment, the lamp start control means gradually reduces the oscillating frequency of the inverter when the discharge lamp is started by a high resonance voltage occurring in the oscillating circuit.

In a preferred embodiment, the lamp start control means comprises a wave generator, and regulates the oscillating frequency within a predetermined range in accordance with the output voltage of the wave generator so as to raise the oscillating frequency of the inverter.

In a preferred embodiment, the lamp start control means comprises a start stop means which is driven when the inverter oscillates at a high frequency whereby the oscillation of the inverter is stopped.

In a preferred embodiment, the choke coil comprises a pair of cores having three leg portions facing each other, and central leg portions are opposed to each other with a spacing and provided with a coil.

Thus, the invention described herein makes possible the objective of providing an apparatus for operating a discharge lamp ensuring (1) that the discharge lamp is lit at a rated electric power, (2) that the discharge lamp and its accessories are protected from being damaged owing to unexpected overload, (3) that the lighting of the discharge lamp is smoothly stabilized without having large variations, (4) that in spite of metallic deposits on the inside wall of the lamp, the reinitiation of discharge after extinguishing the discharge lamp is immediately followed by a stabilized lighting, (5) that the lighting of a lamp can rise up with a constant lighting output in spite of differences in the performances of the lamps, (6) that the discharge lamp is started with certainty and the period of time from the initiation of discharge to the lighting can be shortened, (7) that the discharge lamp is protected from extinction due to an abrupt reduction in the oscillating voltage, (8) that an oscillating voltage is constantly generated, thereby preventing an unexpected large current from flowing through the discharge lamp, (9) that an unnecessary period of generation of an resonance voltage is prevented, thereby protecting the discharge lamp and its accessories from being damaged, and (10) that the discharge lamp is protected from being damaged by an unexpected large current flowing therethrough.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
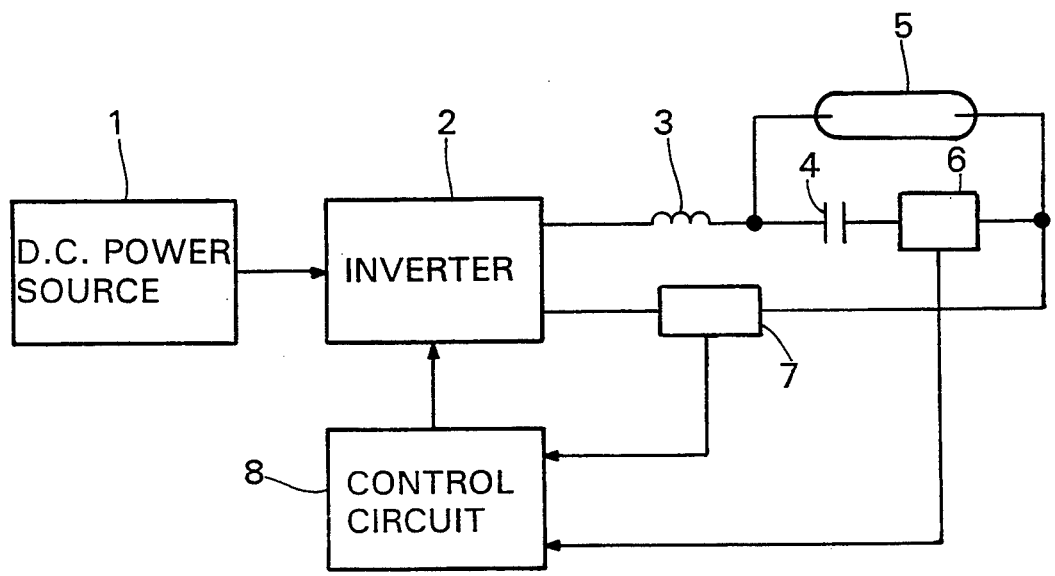
FIG. 1 is a block diagram showing an example of an apparatus for operating a discharge lamp according to the present invention.

Referring to FIG. 1, an inverter 2 is driven by a d.c. power source 1 and generates a clock signal having a predetermined frequency. The inverter 2 includes an resonance circuit having a choke coil 3 as a load circuit and a capacitor 4 connected in series, and a discharge lamp 5 such as a metal halide lamp connected to a junction of the choke coil 3 and the capacitor 4. The load circuit includes a lamp voltage detector circuit 6 and a lamp current detector circuit 7 which are connected in series to the resonance circuit. The lamp voltage detector circuit 6 detects the start of the discharge lamp 5 and regulates the current flowing to the lamp before and after the lighting reaches a stable state. Outputs from the lamp voltage detector circuit 6 and the lamp current detector circuit 7 are input to a lamp start control circuit 8 (hereinafter called "control circuit") which changes the oscillating frequency of the inverter 2 or a duty ratio thereof, thereby regulating the lighting of the discharge lamp 5.

An example of the operation will be described:

When the d.c. power source 1 is turned on, the inverter 2 is oscillated at a first predetermined frequency of about 2 KHz and a voltage having this relatively low frequency is applied to the resonance circuit of the choke coil 3 and the capacitor 4. At this time, an resonance voltage having a high frequency is overlapped thereon. The lamp voltage detector circuit 6 detects this resonance voltage, and the control circuit 8 converts the oscillating frequency of the inverter 2 to a higher frequency, thereby causing the resonance, circuit to generate a voltage through the capacitor 4 at a high frequency such as 100 KHz. This second predetermined higher resonance voltage at the capacitor 4 energizes the discharge lamp 5. In this way a large amount of current flows through the discharge lamp 5, thereby allowing voltages at both terminals to drop. The lamp voltage detector circuit 6 detects this voltage drop which follows the initial discharge. The control circuit 8 regulates the oscillating frequency of the inverter 2 to a third predetermined frequency of 10 KHz or so. In this way, the control circuit 8 lowers the oscillating frequency of the inverter 2 when the lamp voltage is low, by stepping up the amplitude of a current flowing to the discharge lamp 5 through the choke coil 3. If the lamp voltage is high, the control circuit 8 increases the oscillating frequency of the inverter 2 so that the current flowing through the discharge lamp 5 through the choke coil 3 is lessened, thereby stabilizing the discharge lamp 5.

Figure 2A:
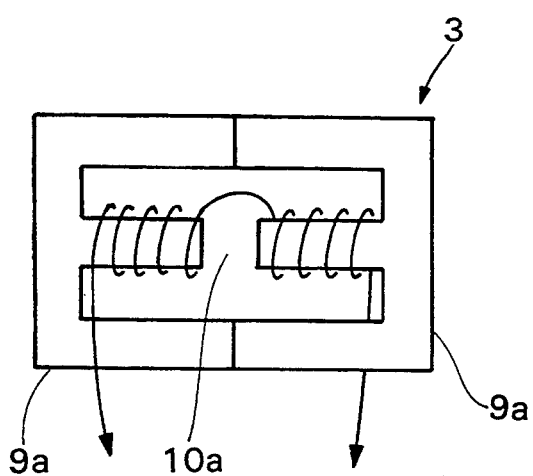
FIGS. 2(a) and 2(b) are schematic views showing examples of a choke coil used in the present invention.
Figure 2B:
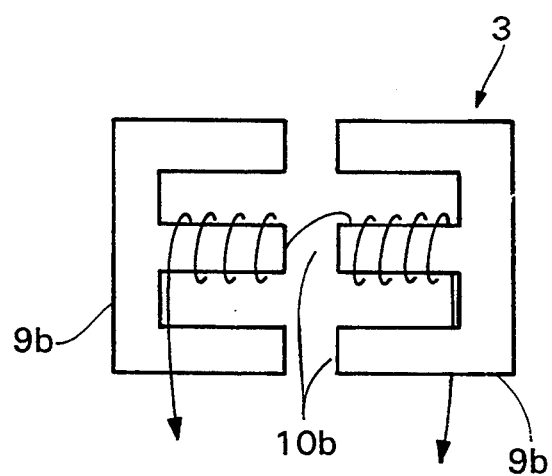

If the inductance of the choke coil 3 is saturated, a great amount of current flows through the discharge lamp 5, and damages it. In order to prevent the inductance of the choke coil 3 from saturation, the choke coil 3 is constructed as shown in FIGS. 2(a) and 2(b). More specifically, the choke coil 3 shown in FIG. 2(a) includes a central gap 10a between the central legs of a pair of cores 9a. Since the legs of each core 9a are close to each other, little leakage of magnetic flux therebetween is secured, and little variation in inductance due to an ambient influence is secured. The choke coil 3 shown in FIG. 2(b) includes three gaps 10b between the legs of the cores 9b. This type of choke coil 3 facilitates insulation between the cores 9b.

Figure 3:
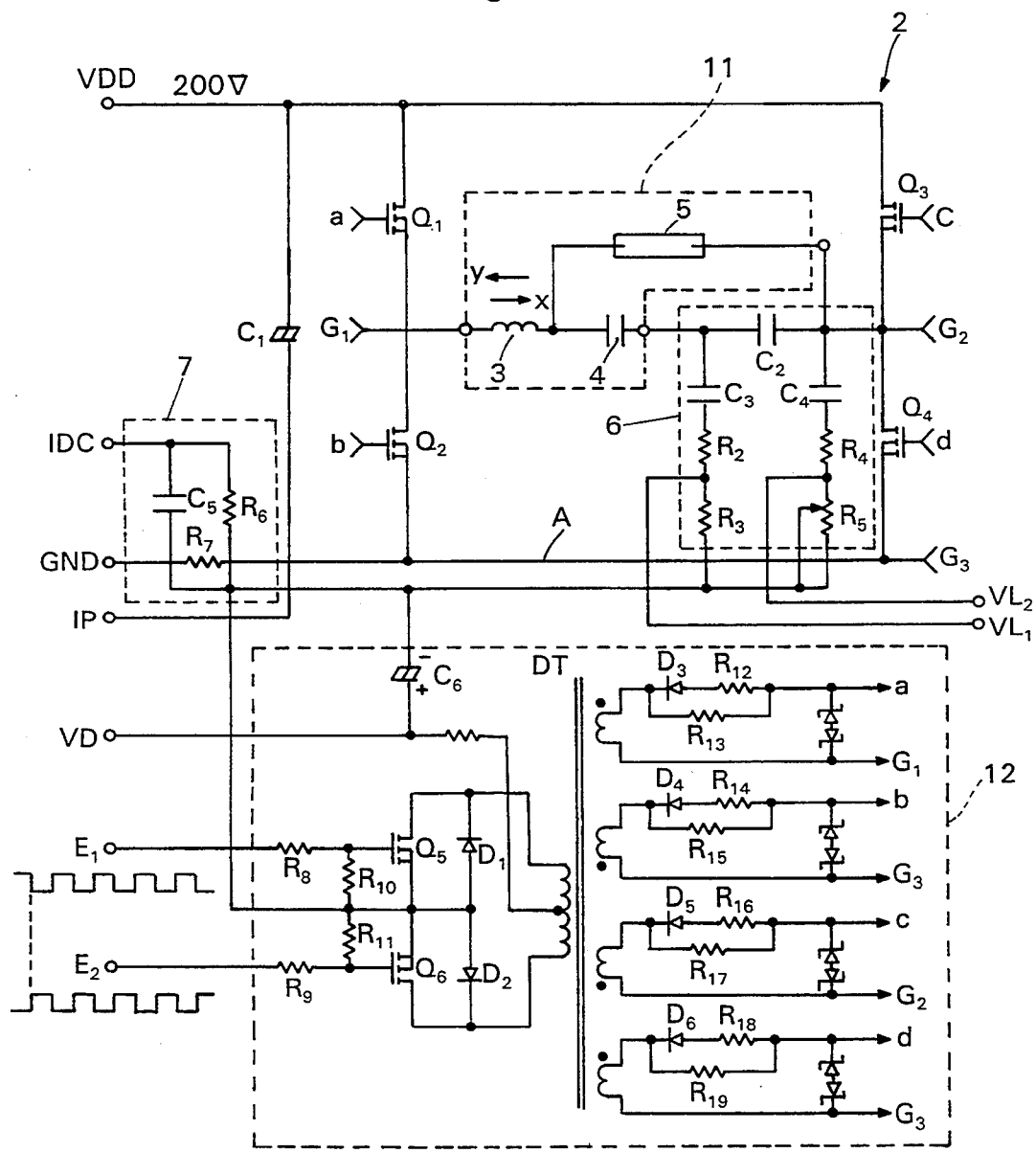
FIG. 3 is a circuit diagram of an inverter used in the present invention.

Referring to FIG. 3, the inverter 2 is a bridge inverter which includes four switching transistors $Q_1$, $Q_2$, $Q_3$ and $Q_4$. The inverter 2 drives an outer circuit 11 which includes the choke coil 3, the capacitor 4, and the discharge lamp 5. In turn, the bridge inverter 2 is driven by a drive circuit 12. A drive transformer DT has a primary winding whose both terminals are grounded through drive transistors $Q_5$ and $Q_6$. The gates of the drive transistors $Q_5$ and $Q_6$ receive clocks $E_1$ and $E_2$ having an central oscillating frequency of 2 KHz, respectively, but whose phases are reversed. A drive voltage VD is applied to a middle point of the primary winding of the drive transformer DT. The drive transformer DT is provided with four secondary windings which are connected to the gates of switching transistors $Q_1$, $Q_2$, $Q_3$ and $Q_4$ through a series circuit of resistance $R_{13}$ and a diode $D_3$ and a parallel circuit with resistance $R_{12}$, a series circuit of resistance $R_{15}$ and a diode $D_4$ and a parallel circuit with resistance $R_{14}$, a series circuit of resistance $R_{17}$ and a diode $D_5$ and a parallel circuit with resistance $R_{16}$, and a series circuit of resistance $R_{19}$ and a diode $D_6$ and a parallel circuit with resistance $R_{18}$, respectively. A series circuit of the switching transistors $Q_1$ and $Q_2$, and a series circuit of switching transistors $Q_3$ and $Q_4$ are disposed between a d.c. source voltage VDD and a ground line A of the bridge, and the outer circuit 11 is disposed between the junction of the switching transistors $Q_1$ and $Q_2$ and the junctions of the switching transistors $Q_3$ and $Q_4$. As illustrated in FIG. 3, one of the terminals of the secondary winding of the transformer DT connected to the gate of the switching transistor $Q_1$ is connected to the junction of the transistors $Q_1$ and $Q_2$. The other terminal of the secondary winding connected to the gate of the switching transistor $Q_3$ is connected to the junction of the switching transistors $Q_3$ and $Q_4$. The other terminals of the secondary windings connected to the respective gate of each switching transistor $Q_2$ and $Q_4$ are connected to the ground line A of the bridge, and connected to a ground GND through a resistance $R_7$. Thus, when the pair of switching transistors $Q_1$ and $Q_4$ are turned on at the same time, the other pair of switching transistors $Q_2$ and $Q_3$ are turned off at the same time.

A lamp voltage detecting circuit 6 will be described below. A voltage detecting capacitor $C_2$ is disposed between the capacitor 4 and the junction of the switching transistors $Q_3$ and $Q_4$, wherein the voltage detecting capacitor $C_2$ constitutes the lamp voltage detector circuit 6. This capacitor $C_2$ has a larger capacitance than the capacitor 4, and voltages across its terminals are detected as a voltage at which the discharge lamp 5 is energized. More specifically, a capacitor $C_3$ and resistances $R_2$ and $R_3$ are connected in series between the input of the capacitor $C_2$ and the ground GND; and a capacitor $C_4$, a resistance $R_4$ and a variable resistor $R_5$ are connected in series between the output of the capacitor $C_2$ and the ground GND. Voltage detecting terminals $VL_1$ and $VL_2$ are connected to the junction of the resistances $R_2$ and $R_3$ and the junction of the resistances $R_4$ and the variable resistor $R_5$, respectively. The voltage difference between the terminals $VL_1$ and $VL_2$ is input to the control circuit 8 as a detecting voltage (FIG. 1).

The other terminals of the switching transistors $Q_2$ and $Q_4$ are connected to the ground GND through a resistance $R_7$ and to the current detecting terminal IDC through a resistance $R_6$. The resistances $R_6$ and $R_7$ constitute the lamp current detector circuit 7 shown in FIG. 1. A lamp instantaneous current plug IP is connected at the input of the lamp current detector circuit 7.

Clocks $E_1$ and $E_2$ having an central oscillating frequency of 2 KHz or so, are respectively applied to each terminal of the primary winding of the drive transformer DT. When the switching transistors $Q_1$ and $Q_4$ are turned on at the same time, a current flows through the resonance circuit of the outer circuit 11 in the direction of arrow (x). At the phase shift due to the application of a next clock signal, when the switching transistor $Q_2$ and $Q_3$ are turned on at the same time, a current flows through the resonance circuit of the outer circuit 11 in the direction of arrow (y). At this time, a voltage having a low frequency such as 2 KHz and a superimposed resonance voltage having a high frequency overlap each other. Under this situation, in response to the detection of this superimposed voltage by the capacitor $C_2$ the oscillating frequency of the inverter 2 is converted into a higher frequency such as 100 KHz. The inverter 2 oscillates at this higher frequency so that a high resonance voltage occurs at the capacitor 4 and the discharge lamp 5 is energized. As a result, a large amount of current flows through the discharge lamp 5, thereby allowing the potential between the voltage detecting terminals $VL_1$ and $VL_2$ to drop abruptly. By monitoring the voltage drop, the initiation of the discharge is detected.

The diodes $D_3$, $D_4$, $D_5$ and $D_6$ and resistances $R_{13}$, $R_{15}$, $R_{17}$ and $R_{19}$ are arranged so as to enable the phase shift of clock pulses to occur with a time difference so that the switching transistors $Q_1$ and $Q_2$, and $Q_3$ and $Q_4$ may not be energized at the same time.

In the example, a bridge inverter is shown but it is possible to use a half-bridge inverter having capacitors instead of the switching transistors $Q_3$ and $Q_4$.

Figure 4:
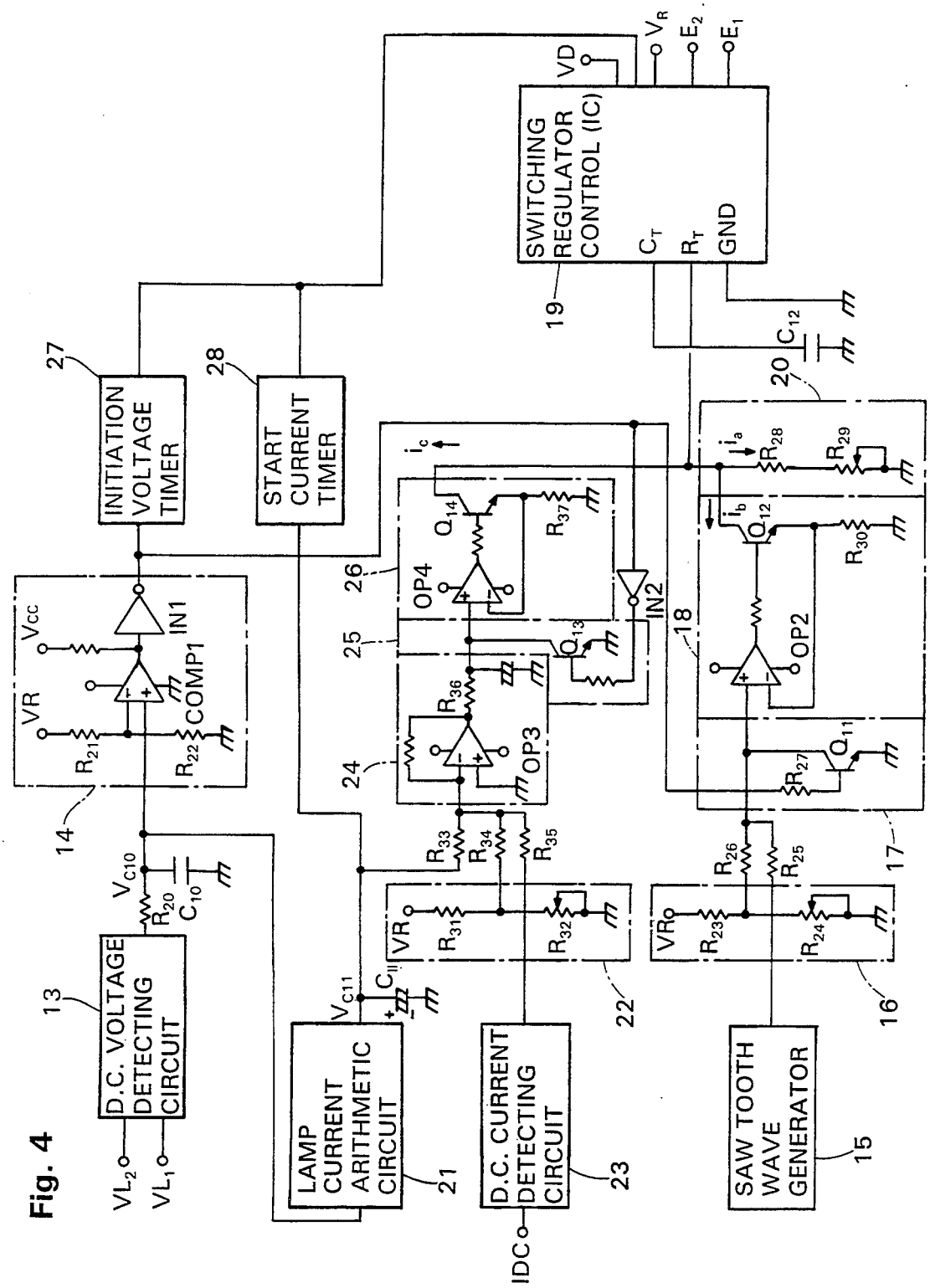
FIG. 4 is a diagram of a lamp start control circuit used in the present invention.

Referring to FIG. 4, a lamp start control circuit 8 (hereinafter called "control circuit") will be described:

The lamp voltage detector circuit 6 includes voltage detecting terminals $VL_1$ and $VL_2$ connected to inputs of a d.c. voltage detecting circuit 13. The lamp voltage detecting circuit 6 comprises a differential amplifier and a rectifier, detects a potential between the terminals $VL_1$ and $VL_2$, and generates a voltage from its output corresponding to an resonance voltage having a high frequency detected by the lamp voltage detector circuit 6.

An output of the d.c. voltage detecting circuit 13 is input to a lamp lighting detecting circuit 14 through a resistance $R_{20}$. A capacitor $C_{10}$ is disposed between the junction of the resistance $R_{20}$ and the lamp lighting detecting circuit 14 and the ground. A voltage $VC_{10}$ generated at the capacitor $C_{10}$ is input to a (+) input terminal of a comparator COMP1 in the lamp lighting detecting circuit 14. The lamp lighting detecting circuit 14 includes the comparator COMP1 and an inverter IN1 for inverting the output of the comparator COMP1. The (−)input terminal of the comparator COMP1 receives a voltage from of the junction of resistances $R_{21}$ and $R_{22}$ as a reference voltage.

When the d.c. power source is switched on, the inverter 2 oscillates at a low frequency, and an resonance voltage having a higher frequency is superimposed thereon. The d.c. voltage detecting circuit 13 outputs a predetermined detecting voltage $V_{C10}$. When the detecting voltage $V_{C10}$ becomes higher than the reference voltage of the lamp lighting detecting circuit 14, the output of the comparator COMP1 in the lamp lighting detecting circuit 14 reaches a high level, and the output of the inverter IN1 drops to a low level. In contrast, when the discharge lamp 5 is lighted by a high resonance voltage occurring in accordance with changes of the oscillating frequency of the inverter 2, the detecting voltage $V_{C10}$ drops to a lower level, and the output of the inverter IN1 reaches a high level.

The control circuit 8 includes a saw tooth wave generator 15. The output voltage of this generator 15 is applied to a first constant current circuit 18 through a resistance $R_{25}$ and a first cut-off circuit 17. The junction of a resistance $R_{25}$ and the first cut-off circuit 17 is connected to a bias voltage output terminal of a first bias circuit 16 through a resistance $R_{26}$, the first bias circuit 16 including a resistance $R_{23}$ and a variable resistor $R_{24}$. The first constant current circuit 18 includes an operational amplifier OP2 whose (+) input terminal receives a voltage obtained by adding an output voltage of the saw tooth wave generator 15 to bias voltage of the first bias circuit 16.

The first cut-off circuit 17 includes a transistor $Q_{11}$ whose collector is connected to the (+) input terminal of the operational amplifier OP2, and its emitter is grounded. The base of the transistor $Q_{11}$ is connected to an output terminal of the inverter IN1 in the lamp lighting detecting circuit 14. Thus, when the output of the inverter IN1 is at a high level, the transistor $Q_{11}$ is on, thereby cutting off the output of the saw tooth wave generator 15 from being delivered to the first constant current circuit 18.

The saw tooth wave generator 15 can be replaced by a triangular wave generator.

The first constant current circuit 18 includes a transistor $Q_{12}$ to which an output of the operational amplifier OP2 is delivered. The base of the transistor $Q_{12}$ is connected to the operational amplifier OP2, and its collector is connected to a terminal $R_T$ of a switching regulator control 19, for example, type TL494C pulse-width-modulation control integrated circuit manufactured by Texas Instruments Asia Ltd. The emitter of the transistor $Q_{12}$ is grounded through a resistance $R_{30}$, and the junction of the emitter and the resistance $R_{30}$ is connected to an (−) input terminal of the operational amplifier OP2. A bias current circuit 20 is connected to an $R_T$ terminal of the switching regulator control 19. The bias current circuit 20 comprises a series connection including a resistance $R_{28}$ and a variable resistor $R_{29}$.

The first cut-off circuit 17 operates such that if the output of the inverter IN1 is at a high level in the lamp lighting detecting circuit 14, $Q_{11}$ is turned on thereby preventing the output of the saw tooth wave generator 15 from being delivered to the first constant current circuit 18. Thus, the transistor $Q_{12}$ is turned off, whereby an amount of a current $i_b$ becomes zero. When the output of the inverter IN1 is at a high level, an output of an inverter IN2 is at a low level, whereby a transistor $Q_{13}$ is turned off, and then an output of a comparator circuit 24 is input to a second constant current circuit 26. When an amount of the lamp current is below a rated lamp current, the output of the comparator circuit 24 is zero or negative so as to allow the lamp current to flow through the discharge lamp 5, whereby a transistor $Q_{14}$ is turned off. As a result, an amount of a current $i_c$ becomes zero. In this way, the bias current circuit 20 receives a current $i_a$ alone. The current $i_a$ depends upon the capacitor $C_{12}$ connected to a terminal $C_T$ of the switching regulator control 19, which outputs clock pulses $E_1$ and $E_2$ (FIG. 3) having inverted phases with respect to each other, (FIG. 3) as described in detail below.

For example, the switching regulator control 19 outputs clocks $E_1$ and $E_2$ at a low frequency such as 2 KHz. Referring to FIG. 3, the switching transistors $Q_1$ and $Q_4$ and $Q_2$ and $Q_3$ are alternately turned on, thereby generating a voltage at a low frequency. An resonance voltage having a high frequency from the choke coil 3 and the capacitor 4 is superimposed on the low voltage, which is detected by the capacitor $C_3$. When the output voltage $V_{C10}$ of the d.c. voltage detecting circuit 13 is higher than the reference voltage in the lamp lighting detecting circuit 14, the output of the lamp lighting detecting circuit 14 drops to a low level, and then an output level of the inverter IN2 becomes high, whereby a transistor $Q_{13}$ is turned on. When the transistor $Q_{13}$ is on, an input level of the second constant current circuit 26 becomes about zero, whereby the transistor $Q_{14}$ is turned off. As a result, an amount of the current $i_c$ becomes zero. On the other hand, the transistor $Q_{11}$ of the first cutoff circuit 17 is turned off, thereby inputting the output of the saw tooth wave generator 15 to the operational amplifier OP2, which outputs a voltage corresponding to the output of the saw tooth wave generator 15. Thus, the transistor $Q_{12}$ is turned on, thereby allowing a current from the terminal $R_T$ of the switching regulator control 19 to flow to the resistance $R_{30}$. The current through the terminal $R_T$ is stepped up until the voltage across the resistance $R_{30}$ has a value corresponding to the saw tooth wave voltage. As a result, a current $(i_a + i_b)$ is produced so that the frequencies of each clock $E_1$ and $E_2$ is boosted up to a given frequency having a predetermined value such as up to 100 KHz. In this way, an resonance voltage occurs in the resonance circuit, and the discharge is initiated. When a voltage across the resistance $R_{30}$ has a value corresponding to the saw tooth wave voltage input to the operational amplifier OP2, the transistor $Q_{12}$ turns off.

The saw tooth wave generator 15 changes an oscillating frequency of the inverter 2 according to a frequency within a range, inclusive of the resonance frequency of the LC circuit, predetermined by the choke coil 3 and the capacitor 4. This ensures the generation of an resonance voltage from the saw tooth wave voltage. As a result, the resonance voltage occurs for a short period of time, thereby protecting the components of the discharge lamp from being damaged owing to the passage of a large amount of current. This enhances the reliability of the discharge lamp, and eliminates the possibility of suffering from a possible voltage drop at the d.c. power source.

Normally, a current $i_a$ flows through the bias current circuit 20 from the terminal $R_T$ of the switching regulator control 19. This ensures that the oscillating frequency of the inverters are constantly above the first predetermined value of 2 kHz. The oscillating frequency of the inverter 2 is in a range from 5 kHz to 10 kHz during a period of time extending from the start of the discharge lamp until a stable lighting of the discharge lamp is obtained. The oscillating frequency is about 10 kHz in the stable lighting. Even if a current is unexpectedly delivered, a large current having a low frequency not exceeding the oscillating frequency is prevented from flowing through the discharge lamp.

The output of the d.c. voltage detecting circuit 13 is delivered to the lamp lighting detecting circuit 14, and also to a lamp current arithmetic circuit 21. The output terminal of the lamp current arithmetic circuit 21 is connected to a starter current timer 28, and to the ($-$) input terminal of an operational amplifier OP3 in a comparator circuit 24 through a resistance $R_{33}$. An output terminal of a second bias circuit 22 or bias means including a resistance $R_{31}$ and a variable resistor $R_{32}$ is also connected to the ($-$) input terminal of the operational amplifier OP3 through a resistance $R_{34}$. A current detecting terminal IDC of the lamp current detecting circuit 7 is connected to the input terminal of d.c. current detecting circuit 23. An output terminal of the d.c. current detecting circuit 23 is also connected to the ($-$) input terminal of the operational amplifier OP3 through a resistance $R_{35}$. The second bias circuit 22 generates a bias voltage which becomes a reference for a rated lamp current. Outputs of the lamp current arithmetic circuit 21, the second bias circuit 22 and the d.c. current detecting circuit 23 are added and input to the ($-$) input of the operational amplifier OP3 in the comparator circuit 24 as a d.c. voltage. The comparator circuit 24 generates a voltage corresponding to a difference between the d.c. output voltage and the reference voltage until the voltage input to the ($-$) input terminal of the operational amplifier OP3 reaches zero.

The output of the comparator circuit 24 is delivered to the ($+$) input terminal of an operational amplifier OP4 in a second constant current circuit 26 through a second cut-off circuit 25, which is constituted by a transistor $Q_{13}$. The collector Q is connected to the ($+$) input terminal of the operational amplifier OP4 in the second constant current circuit 26 and the emitter is connected to the ground. The base of the transistor $Q_{13}$ is connected to an output of an inverter IN2. The inverter IN2 also receives an output of the inverter IN1 in the lamp lighting detecting circuit 14. When the output from the inverter IN1 drops to a low level, the output of the inverter IN2 reaches a high level, thereby turning the transistor $Q_{13}$ on. The output of the comparator circuit 24 is cut off against the second constant current circuit 26. The second constant current circuit 26 has a series circuit constituted by a transistor $Q_{14}$ and a resistance $R_{37}$. The resistance $R_{37}$ is disposed between the emitter of the transistor $Q_{14}$ and the ground. The base of the transistor $Q_{14}$ is connected to the output terminal of the operational amplifier OP4. The collector of transistor $Q_{14}$ is connected to the $R_T$ terminal of the switching regulator control 19. The terminal $R_T$ is connected to the bias current circuit 20. The junction of the transistor $Q_{14}$ and the resistance $R_{37}$ is connected to the ($-$) input terminal of the operational amplifier OP4. When the transistor $Q_{14}$ is on, a current $i_c$ is discharged from the terminal $R_T$ through the resistance $R_{37}$.

Figure 5:
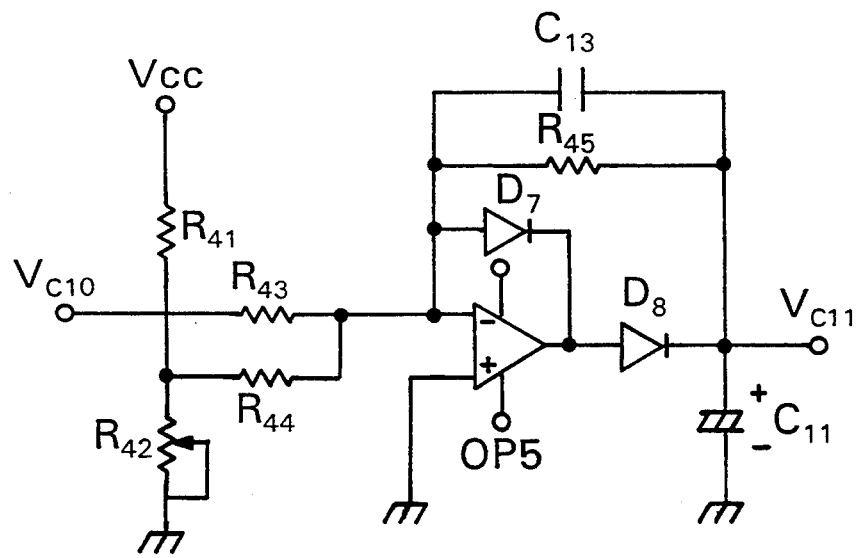
FIG. 5 is a diagram of a lamp current arithmetic circuit used in the lamp control circuit of FIG. 4.

As shown in FIG. 5, the lamp current arithmetic circuit 21 includes a resistance $R_{43}$ connected to an output voltage $V_{C10}$ from the capacitor $C_{10}$ connected to the output of d.c. voltage detecting circuit 13. The junction of a resistance $R_{41}$ and a variable resistor $R_{42}$ is connected to the output side of the resistance $R_{43}$ through a resistance $R_{44}$ so that a bias voltage at the junction of the resistance $R_{41}$ and the variable resistor $R_{42}$ is added to the output terminal of the resistance $R_{43}$ through the resistance $R_{44}$. The resistance $R_{43}$ is connected to the ($-$) input terminal of an operational amplifier OP5 whose ($+$) input terminal is grounded. The operational amplifier OP5 reverses and amplifies output voltage $V_{C10}$ from the capacitor $C_{10}$ connected to the d.c. voltage detecting circuit 13 with the addition of a bias voltage. An anode of a diode $D_8$ is connected to the output terminal of the operational amplifier OP5. The anode of a diode $D_7$ is connected to the ($-$) input terminal of the operational amplifier OP5, and the cathode thereof is connected to the output terminal of the operational amplifier OP5. A resistance $R_{45}$ and a capacitor $C_{13}$ are respectively connected in parallel with the series connection of the operational amplifier OP5 and the diode $D_8$. A capacitor $C_{11}$ is connected between ground and the cathode of the diode $D_8$. A voltage $V_{C11}$ across the capacitor $C_{11}$ is transmitted to the lamp arithmetic circuit 21.

Figure 6:
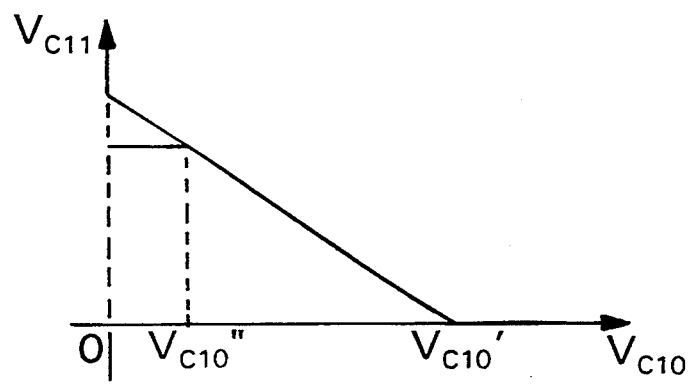
FIG. 6 is a graph showing the characteristics of the lamp current arithmetic circuit.

Under such a configuration of the lamp current arithmetic circuit 21 the relationship as shown in FIG. 6 is established between the voltages $V_{C11}$ across the capacitor $C_{11}$ and the output voltage $V_{C10}$ in the d.c. voltage detecting circuit 13. In FIG. 6, when the output voltage $V_{C10}$ falls within a range of $V_{C10''}$ to $V_{C10'}$, the output voltage $V_{C11}$ lowers as the lamp voltage rises. When the lamp voltage falls below the lower limit $V_{C10''}$, the circuit is clipped so that the output voltage $V_{C11}$ becomes constant owing to the saturated voltage of the operational amplifier OP5. When the lamp voltage is above the upper limit $V_{C10'}$, the output voltage $V_{C11}$ of the lamp current arithmetic circuit 21 becomes zero. In the latter case, the reference voltage of the comparator circuit 24 is provided by the bias voltage of the second bias circuit 22 alone.

Instead of using the saturated voltage of the operational amplifier OP5, a zener diode can be used, which is connected to the output terminal of the lamp current arithmetic circuit 21. Any additional circuit can be provided to regulate the lower limit so as to maintain the output voltage on or above a predetermined value.

As is evident from the foregoing description, a resonance voltage is generated by increasing the frequencies of the clocks $E_1$ and $E_2$, thereby starting the discharge lamp 5. After the discharge is initiated, the output voltage $V_{C10}$ of the d.c. voltage detecting circuit 13 is stepped down and the output voltage $V_{C11}$ of the lamp current arithmetic circuit 21 becomes larger so as to allow an electric current to flow through the discharge lamp 5. At this stage, the reference voltage is stepped up, thereby enlarging a difference from the output voltage of the d.c. current detecting circuit 23. As a result, the output of the comparator circuit 24 becomes below zero; that is, (−). At the same time, the output of the lamp lighting detecting circuit 14 reaches a high level, thereby turning on the transistor $Q_{11}$ in the first cut-off circuit 17. Thus, the output of the saw tooth wave generator 15 is prevented from being delivered to the first constant current circuit 18. Thus, the transistor $Q_{12}$ of the first constant current circuit 18 turns off, thereby preventing a current $i_b$ from flowing from the terminal $R_T$ of the switching regulator control 19 to the ground. When the output of the lamp lighting detecting circuit 14 reaches a high level, the transistor $Q_{13}$ of the second cut-off circuit 25 turns becomes off, thereby inputting the negative output of the operational amplifier OP3 in the comparator circuit 24 to the operational amplifier OP4 in the second constant current circuit 26. Because the (+) input of the operational amplifier OP4 receives negative voltage from the comparator 24, the output of the operational amplifier OP4 keeps the transistor $Q_{14}$ off. Thus, a current from the terminal $R_T$ of the switching regulator control 19 is prevented from being discharged through the transistor $Q_{14}$. As a result, a current $1_a$ alone flows from the terminal $R_T$, and therefore the frequencies of the clocks $E_1$ and $E_2$ oscillated from the switching regulator control 19 drop to the original low levels such as 2 KHz. This steps up a current delivered to the discharge lamp, thereby increasing the output voltage $V_{C10}$ of the d.c. voltage detecting circuit 13. As the output voltage $V_{C10}$ of the d.c. voltage detecting circuit 13 increases, the output voltage $V_{C11}$ in the capacitor $C_{11}$ decreases. Accordingly, the lamp current arithmetic circuit 21 has an decreasing output voltage $V_{C11}$. In this way, the output of the operational amplifier OP3 increases from minus (−) to plus (+) through zero. Then, the transistor $Q_{14}$ of the second constant current circuit 26 turns on, thereby allowing a current $i_c$ from the terminal $R_T$ of the switching regulator control IC19 to discharge through a resistance $R_{37}$. As a result, two discharged currents, that is, a discharged current $i_a$ from the terminal $R_T$ of the switching regulator control 19 through the bias current circuit 20, and a discharged current $i_c$ through the resistance $R_{37}$ step up the oscillating frequencies of the clocks $E_1$ and $E_2$ of the switching regulator control 19. Thus, after the discharge lamp 5 starts, a lamp voltage gradually increases the output voltage $V_{C10}$ of the d.c. voltage detecting circuit 13 increases, and the output voltage $V_{C11}$ of the lamp current arithmetic circuit 21 lowers, whereby the lamp current lowers. At the same time, the output voltage of the lamp current detecting circuit 23 lowers, and increases the discharged current through the transistor $Q_{14}$ of the second constant current circuit 26. This enables the operational amplifier OP4 to operate so that the output voltage of the operational amplifier OP3 input to the (+) input terminal of the operational amplifier OP4 are and the feedback voltage based on the resistance $R_{37}$ input to the (−) input terminal thereof become equal, thereby increasing the oscillating frequencies of the clocks $E_1$ and $E_2$. This operation is repeated until the output voltage $V_{C11}$ of the lamp current arithmetic summing circuit 21 becomes zero. Finally, when the output voltage of the d.c. current detecting circuit 23 has a value corresponding to the output voltage of the second bias circuit 22, stability is reached. The clocks $E_1$ and $E_2$ oscillate at 10 KHz or around which is determined by a sum $(i_a + i_c)$ where $i_a$ is a discharge current flowing through the bias current circuit 20 and $i_c$ is a discharged current flowing through the transistor $Q_{14}$. As a result, the discharge lamp 5 is lit by a rated lamp power when a stabilized state is reached which is below a predetermined lamp voltage.

Figure 7:
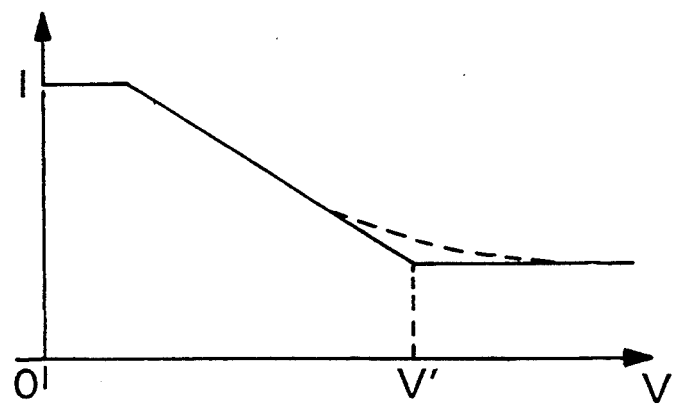
FIG. 7 is a graph showing the lamp current-lamp voltage characteristics of the lamp current arithmetic circuit.

Referring to FIG. 7, the lamp voltage (V) the lamp current (I) characteristics depicted in a graph will be described:

From the initiation of the discharge lamp up to the stabilized state at a predetermined voltage V' a relatively large d.c. current flows through the discharge lamp for a relatively small lamp voltage. If the voltage is likely to rise above the predetermined voltage V' at which the lamp lighting is stabilized, it is controlled so that a constant current is allowed to flow. As a result, the lighting can be quickly stabilized after the lamp is lit. After stabilization, the power remains constant, and the lamp 5 is lit at a rated power.

In this way the control circuit 8 controls the inverter 2 on the basis of a detected voltage of the lamp voltage detector circuit 6. If the lamp voltage is low, the control circuit 8 lowers the frequencies of the clocks E1 and E2 so as to allow a larger current to flow through the lamp. If the lamp voltage is high, it raises the frequencies of the clocks $E_1$ and $E_2$, thereby allowing a smaller current to flow through the lamp.

The output terminal of the lamp lighting detecting circuit 14 in the control circuit 8 is connected to an initiation voltage timer 27. By turning on the d.c. power source, the inverter 2 oscillates at a low frequency. An resonance voltage having a high frequency is superimposed on the oscillating voltage having a low frequency, and the superimposed resonance voltage is detected by the d.c. voltage detecting circuit 13. If the detected voltage $V_{C10}$ is higher than the reference voltage of the lamp lighting detecting circuit 14, the output of the inverter IN1 drops to a low level, and the discharge is initiated. The initiation voltage timer 27 is started at the low level of the inverter IN1. If the inverter IN1 does not rise to a high level in a predetermined period of time, a given signal is output to a given terminal so as to stop the switching regulator control 19 from oscillating. In this way, even if the discharge is initiated, and if the stability of the lamp is not reached in a predetermined period of time, the initiation voltage timer 27 stops the oscillation of the switching regulator control 19 whereby the inverter 2 is stopped from oscillating. This prevents the application of high voltage for a long time to the discharge lamp 5, thereby avoiding damaging the discharge lamp, and securing safety.

The start current timer 28 is connected to an output terminal of the lamp current arithmetic circuit 21. The start current timer 28 detects if the lamp current is larger than a predetermined value, thereby stopping the oscillation of the switching regulator control 19 and generates an appropriate signal to a predetermined terminal. The start current timer 28 starts when it is detected that the lamp voltage becomes smaller than a predetermined value, that is, the output voltage $V_{C11}$ of the lamp current arithmetic circuit 21 becomes higher than a predetermined value. If the output voltage $V_{C11}$ does not become smaller than a predetermined value within a predetermined period of time (for example, 20 sec. or less), the oscillation of the inverter 2 by the switching regulator control 19 is stopped. This prevents a large amount of current from flowing through the discharge lamp 5 for a long time, thereby protecting the lamp 5 from being damaged.

The start current timer 28 can be connected so that it starts to operate by the output voltage $V_{C10}$ of the d.c. voltage detecting circuit 13. In this case, if the voltage $V_{C10}$ does not rise above a predetermined value within a predetermined period of time, the inverter 2 is stopped from oscillating by stopping the oscillation of the clocks by the switching regulator control 19.

EXAMPLE 2

Figure 8:
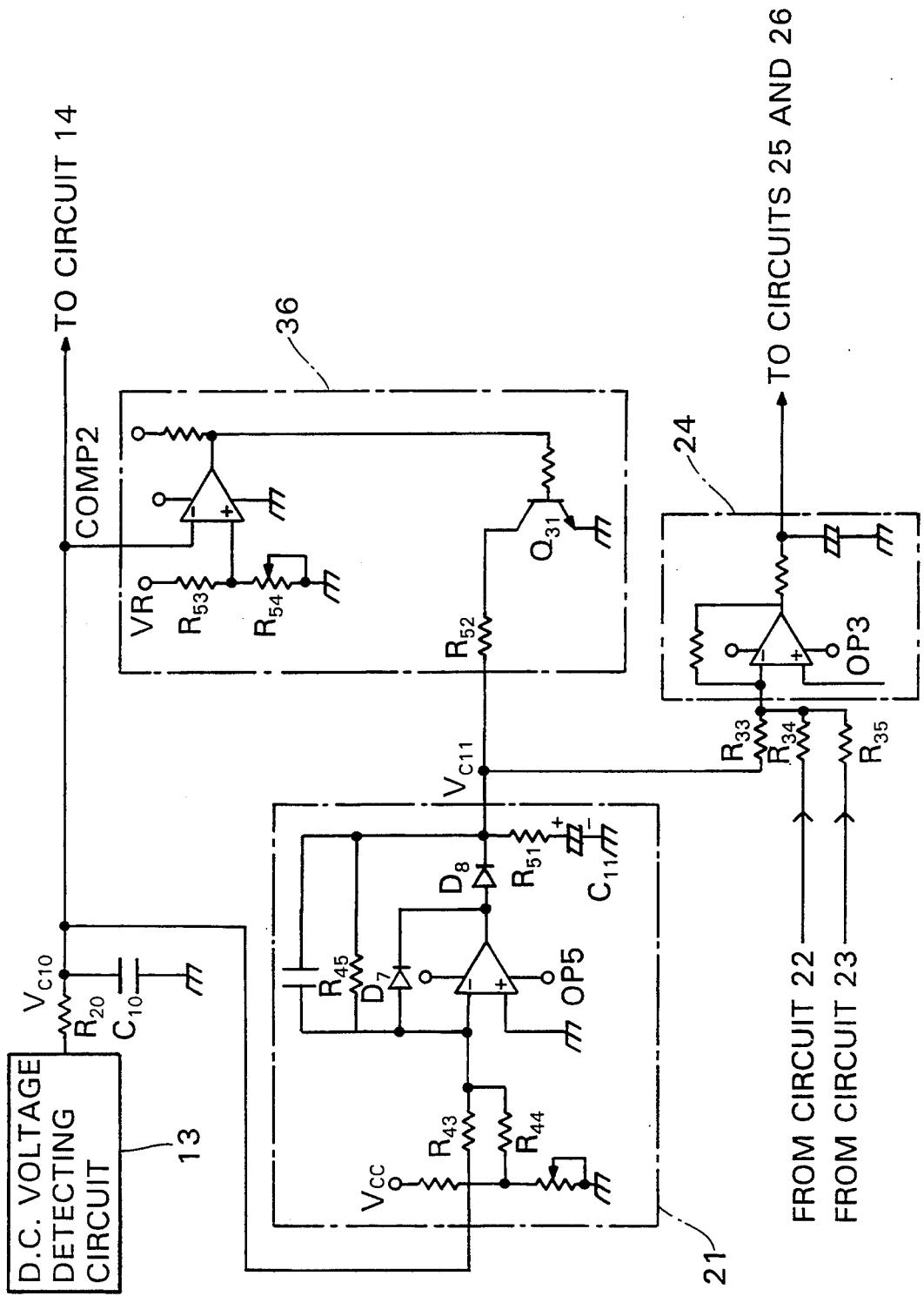
FIG. 8 is a diagram of a modified lamp current arithmetic circuit used in the lamp control circuit.

Referring to FIG. 8, a lamp current arithmetic circuit 21 is provided with a time constant shift circuit 36, which changes a time constant if the lamp voltage becomes larger than a predetermined value so that the lamp current lowers. The output terminal of the lamp current arithmetic circuit 21 is connected to a series circuit including a resistance $R_{51}$ and a capacitor $C_{11}$, the capacitor $C_{11}$ being grounded. The time constant shift circuit 36 receives an output from the d.c. voltage detecting circuit 13. An output from the time constant shift circuit 36 is connected to the output terminal of the lamp current arithmetic circuit 21. The time constant shift circuit 36 includes a comparator COMP2 and a transistor $Q_{31}$, and the ($-$) input terminal is connected to the output terminal of the d.c. voltage detecting circuit 13. The (+) input terminal of the comparator COMP2 is connected to a reference point of a forward bias series connection including resistances $R_{53}$ and $R_{54}$, and an output terminal of the comparator COMP2 is connected to the base of the transistor $Q_{31}$. The collector of the transistor $Q_{31}$ is connected to a resistance $R_{51}$ at the output terminal of the lamp current arithmetic circuit 21 through a resistance $R_{52}$. The junction of the resistances $R_{51}$ and $R_{52}$ is connected to the ($-$) input terminal of the operational amplifier OP3 in the comparator circuit 24 through the resistance $R_{33}$. The emitter of the transistor $Q_{31}$ is grounded.

In the time constant shift circuit 36, when the output $V_{10}$ of the d.c. voltage detecting circuit 13 drops below the reference point in the forward bias series connection including resistances $R_{53}$ and $R_{54}$, the comparator COMP2 has a high output, thereby turning on the transistor $Q_{31}$. The resistance $R_{52}$ is thereby grounded. After the discharge is initiated, the drop of the output voltage $V_{C10}$ of the d.c. voltage detecting circuit 13 below the reference point causes part of the output current of the lamp current arithmetic circuit 21 to discharge through the resistance $R_{52}$. As shown in FIG. 7, the time constant of the lamp current drops changes in a relatively small amplitude as determined by an amount of discharged current through the resistance $R_{52}$. If the output voltage $V_{C10}$ rises above the reference point, the comparator COMP2 has a low output, thereby turning the transistor $Q_{31}$ off. Thus, the resistance $R_{52}$ is disconnected from the ground line. As a result, the time constant of the lamp current drops becomes large as shown by dotted lines in FIG. 7. The lamp current gradually changes at a relatively large time constant, thereby stabilizing the discharge lamp. In this way the time constant for current drop is increased when the lamp voltage rises above a predetermined value. After the discharge lamp is stabilized at a rated output, the output is kept constant, thereby maintaining the stabilization of the lamp lighting.

EXAMPLE 3

Figure 9:
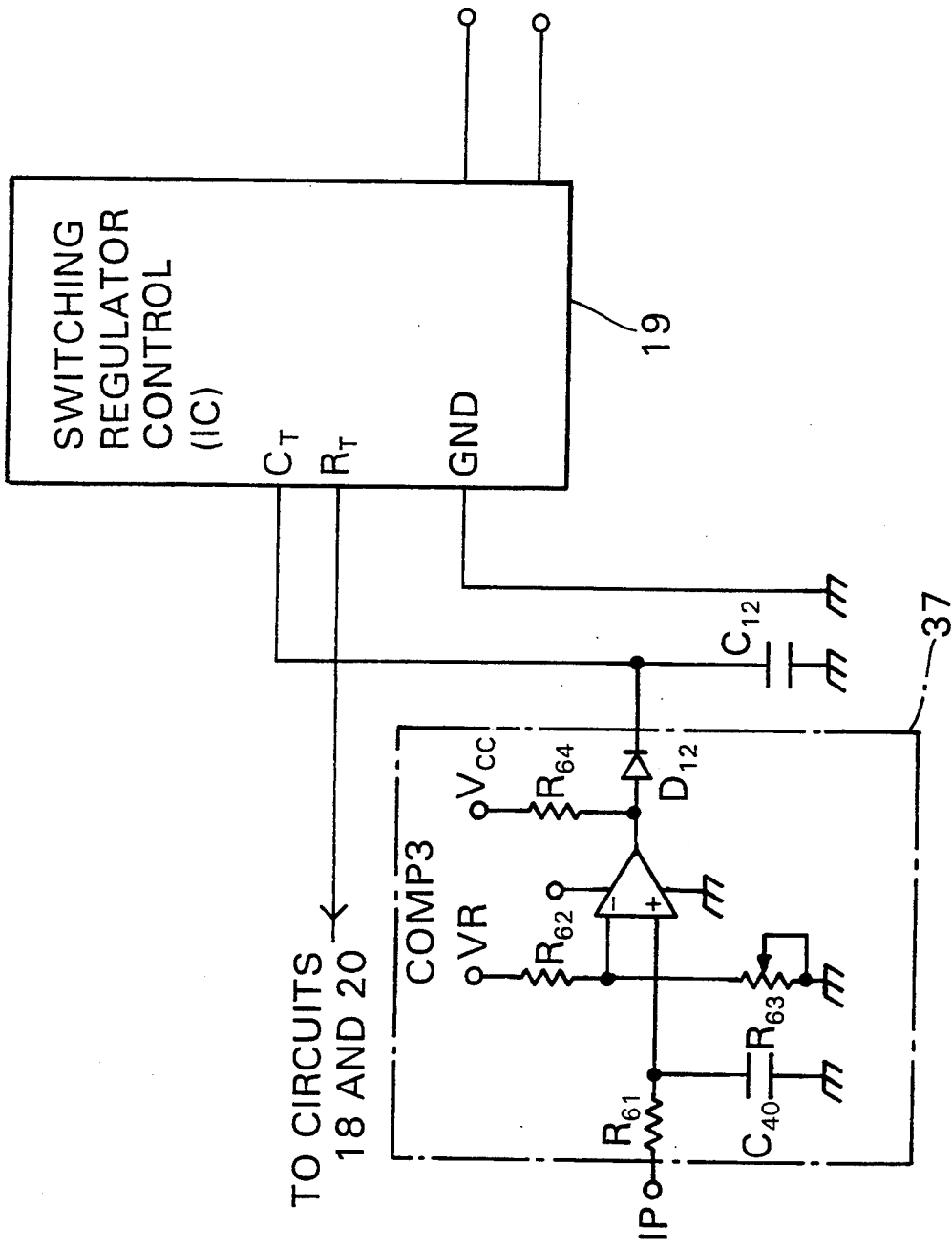
FIG. 9 is a diagram of the lamp control circuit using a lamp instantaneous circuit.

Referring to FIG. 9, a protective circuit will be described:

The protective circuit includes a lamp instantaneous current value detecting circuit 37 (hereinafter called "detector circuit"), which is equipped so as to prevent an excessive current from flowing through the discharge lamp 5. Thus the discharge lamp is protected against various troubles due to an unexpected excess current. The detector circuit 37 includes a lamp instantaneous current terminal connected to the terminal IP of FIG. 3 equivalent to a lamp instantaneous current plug IP in FIG. 3. The output is connected between a terminal $C_T$ of the switching regulator control 19 and the capacitor $C_{12}$, which is grounded. The lamp instantaneous current terminal IP is connected to the (+) input terminal of the comparator COMP3 through the resistance $R_{61}$. A bias circuit is constituted by a series connection including resistances $R_{62}$ and $R_{63}$, and the bias point is connected to the ($-$) input terminal of the comparator COMP3, whose output terminal is connected to the anode of a diode $D_{12}$. This anode is connected to a power source $V_{CC}$, and its cathode is connected to a junction of the terminal $C_T$ of the switching regulator control 19 and the capacitor $C_{12}$.

In the detector circuit 37 if an excess current flows through the discharge lamp 5 and the voltage rises above the bias voltage in the bias circuit 20, the output of the comparator COMP3 has a high level, thereby rapidly charging the capacitor $C_{12}$ from the power source. As a result, the clocks $E_1$ and $E_2$ are rapidly inverted, and this inversion cuts off the excess current. Thus, the discharge lamp is protected from being damaged due to an excess current.

Instead of effecting the rapid inversion of the clocks, the alternative way is to stop the oscillation of the clocks of the switching regulator control 19 temporarily.

EXAMPLE 4

Figure 10:
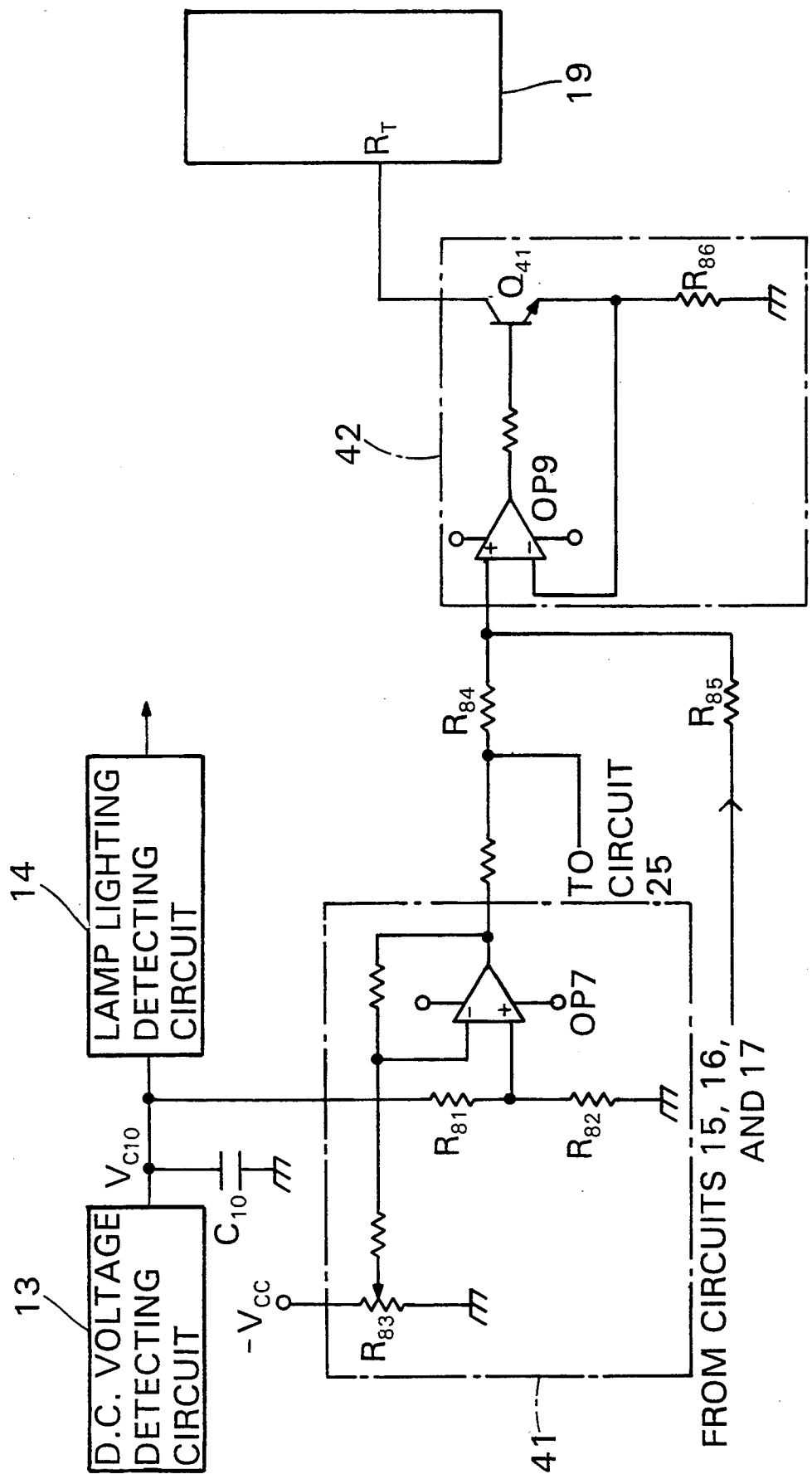
FIG. 10 is a diagram of a modified lamp current arithmetic circuit.

Referring to FIG. 10, an output terminal of a d.c. voltage detecting circuit 13 is connected to the lamp current arithmetic circuit 41, which includes an operational amplifier OP7. The output voltage $V_{C10}$ of the circuit 13 is divided by resistances $R_{81}$ and $R_{82}$, and the divided voltages are input to the (+) input terminal of the operational amplifier OP7. A minus (−) bias voltage obtained from a variable resistor $R_{83}$ is input to the (−) input terminal of the operational amplifier OP7. The output of the operational amplifier OP7 is input to the (+) input terminal of the operational amplifier OP9. The collector of a transistor $Q_{41}$ is connected to the terminal $R_T$ of the switching regulator control 19, and the emitter is grounded through a resistance $R_{86}$. A voltage occurring in a resistance $R_{86}$ is input to the (−) input terminal of the operational amplifier OP9. The transistor $Q_{41}$ of the constant current circuit 42, when it is on, connects the terminal $R_T$ of the switching regulator control 19 to the ground.

When the output voltage $V_{C10}$ of the d.c. voltage circuit 13 is zero, the operational amplifier OP7 in the lamp current arithmetic circuit 41 outputs a voltage corresponding to the bias voltage of the variable resistor $R_{83}$, thereby turning the transistor $Q_{41}$ on. Thus, a given current flows through the resistance $R_{86}$ from the switching regulator control 19, which, as a result, oscillates at a low frequency when the discharge is initiated, and raises the lamp voltage. Accordingly, the output of the operational amplifier OP7 increases, and causes the discharge current to increase through the resistance $R_{86}$. In this way, the oscillating frequency is increased, thereby decreasing the amount of a current flowing through the lamp 5. When the lamp voltage is decreased, the discharge current diminishes through the constant current circuit 42, thereby lowering the oscillating frequency of the switching regulator control 19. Thus, the lamp current is stepped up. The lamp voltage, and accordingly, the switching regulator control 19 is controlled so that clocks are generated at a predetermined frequency corresponding to the lamp current. As a result, the discharge lamp 5 is controlled so that the lamp is stably lit at a rated current.

The circuit of Example 4 is more simplified than that shown in FIG. 4, in that the d.c. current detecting circuit 23, the second bias circuit 22 and the comparator circuit 24 are omitted.

EXAMPLE 5

Figure 11:
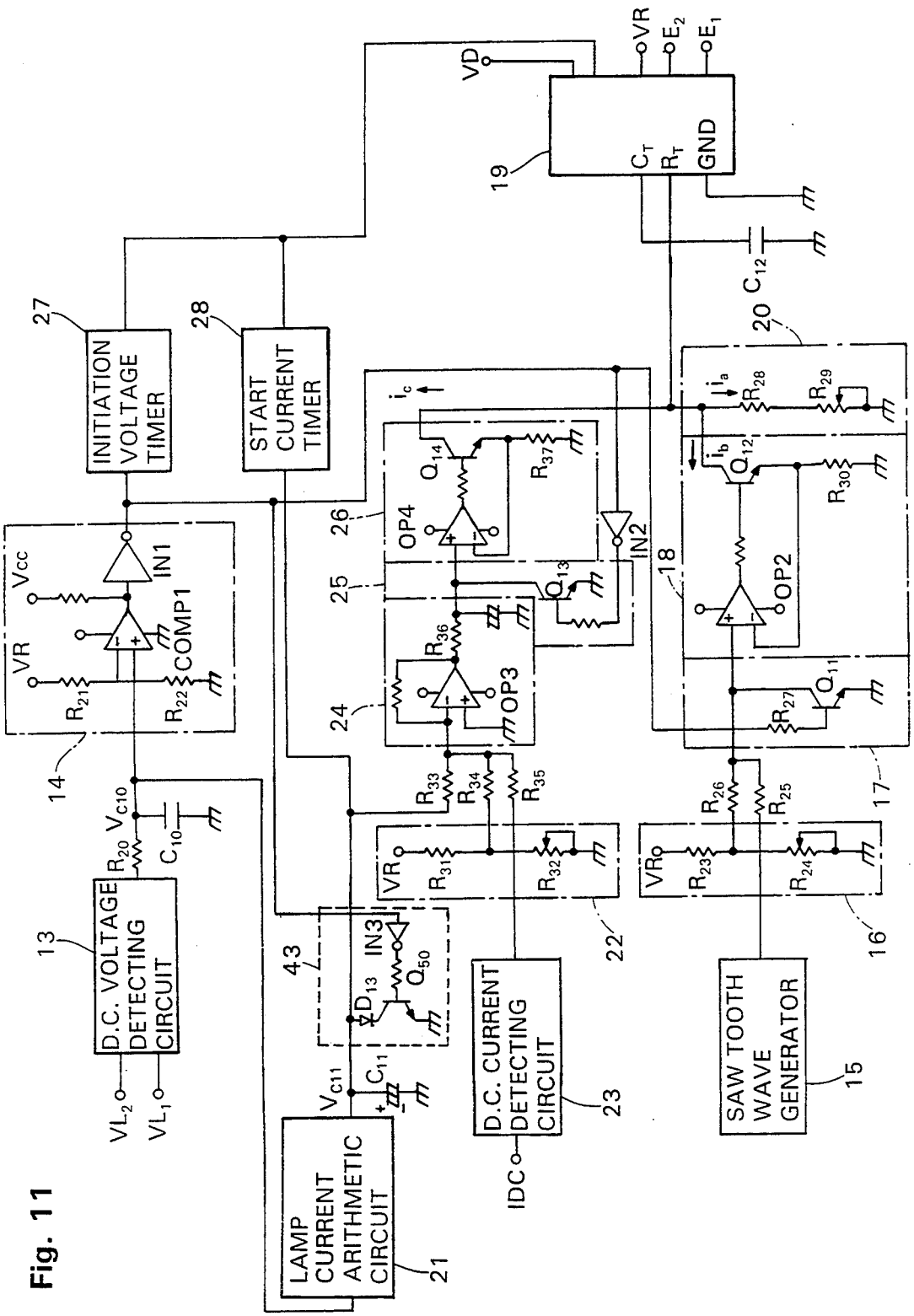
FIG. 11 is a diagram of another modified lamp current arithmetic circuit.

Referring to FIG. 11, a voltage set-up circuit 43 on starting initial current set up means will be described, which is provided as a device for setting up an initial current at which the discharge is initiated:

An input terminal of the voltage set-up circuit 43 includes an inverter IN3 connected to the lamp lighting detecting circuit 14, a transistor $Q_{50}$, and a diode $D_{13}$ whose cathode is connected to the collector of the transistor $Q_{50}$. The anode of the diode $D_{13}$ is connected to the output terminal of the lamp current arithmetic circuit 21. The emitter of the transistor $Q_{50}$ is grounded. The series connection of the transistor $Q_{50}$ and the diode $D_{13}$ is connected in parallel with the capacitor $C_{11}$ connected to the output terminal of the lamp current arithmetic circuit 21. The other structure is the same as that shown in FIG. 4.

An example of the operation will be described:

When the power source is turned on, a voltage is applied to the discharge lamp. Initially, the voltage is low, and the lamp current arithmetic circuit 21 outputs a large voltage. Thus a voltage occurs in the capacitor $C_{11}$. As the voltage applied to the lamp becomes larger, the lamp lighting detecting circuit 14 operates and its output becomes low at which the control circuit 8 is driven so as to initiate the discharge. In response to the output of the lamp lighting detecting circuit 14 an output of the inverter IN3 in the voltage set-up circuit 43 rises to a high level, thereby turning the transistor $Q_{50}$ on. The charge of the capacitor $C_{11}$ is discharged through the diodes $D_{13}$ and the transistor $Q_{50}$, and the voltage of the capacitor $C_{11}$ has an added value in the forward direction voltages of the diode $D_{13}$ and the transistor $Q_{50}$. In this way, at the initiation of the discharge the voltage of the capacitor $C_{11}$ is clipped to a predetermined value. Then, when the discharge lamp 5 is lit, the output of the lamp lighting detecting circuit 14 rises to a high level, thereby turning the transistor $Q_{50}$ off. While the discharge lamp 5 is lit, the voltage of the capacitor $C_{11}$ is clipped to a predetermined value, because when the lamp voltage is relatively low which raises the output of the lamp current arithmetic circuit 21. If the lamp voltage is high, and the output of the lamp current arithmetic circuit 21 becomes lower than the value of the capacitor $C_{11}$ at the time of the intitiation of discharge, the voltage of the capacitor $C_{11}$ remains the same as that at the initiation of discharge. This means that when the discharge lamp 5 is to be reinitiated, the lamp current becomes larger than a current at which the lighting is stabilized. Even after the discharge lamp is reinitiated, and the voltage is still high, the lamp current is stepped up, and after the lamp is put off where the confined metal sticks to the inside wall of the lamp tube or the vapor of it becomes inactive, the lighting stability is secured from the initiation of discharge with regular lighting output.

EXAMPLE 6

Figure 12:
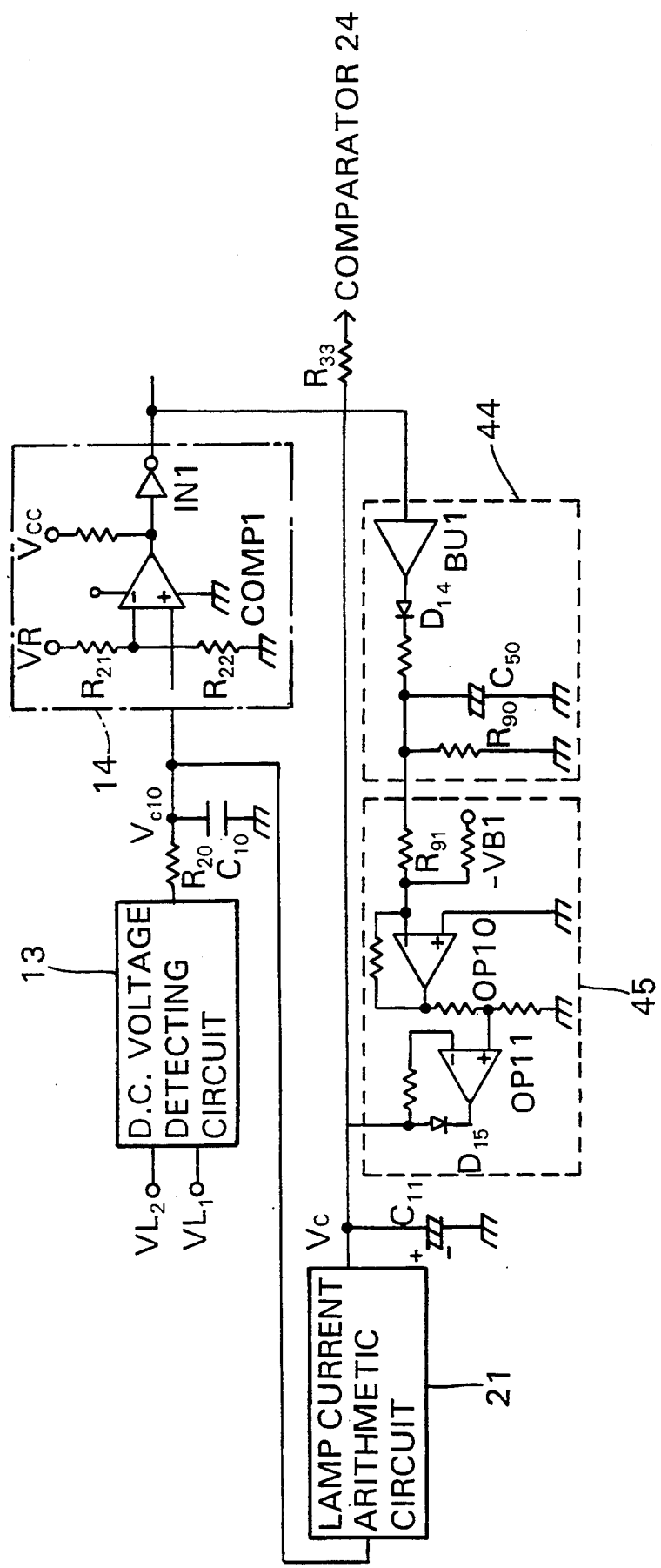
FIG. 12 is a diagram of a voltage set-up circuit used in the lamp start control circuit.

Referring to FIG. 12, there is provided a lamp extinguishing time detecting circuit 44 or after extinct period detecting means which detects a period of time for which the discharge lamp is put off. The lamp extinguishing time detecting circuit 44 is used together with a voltage set-up circuit 45, which, in response to the output of the circuit 44, sets up an initial lamp current so that a larger current can be set up at the first or second initiation (reinitiation) of discharge as compared with the current at which the lighting is stabilized. The set-up circuit 45 includes a buffer circuit BU1 connected to an output terminal of the lamp lighting detecting circuit 14, and a resistance $R_{90}$ connected to the output of the buffer circuit BU1 through the diode $D_{14}$. The resistance $R_{90}$ and the capacitor $C_{50}$ are grounded, and connected in parallel with each other. The voltage set-up circuit 45 includes an inversion circuit OP10 connected to the output terminal of the circuit 44 through the resistance $R_{90}$, and a clip circuit OP11 which limits an output terminal to an output voltage of the inversion circuit OP10 in response to an output of the inversion circuit OP10. The clip circuit OP11 is connected so as to limit the voltage of the capacitor $C_{11}$ connected to the output of the lamp current arithmetic circuit 21.

An example of the operation will be described, in which the description of like components and elements to those in FIG. 11 will be omitted for simplicity:

When the power source is turned on, the lamp current arithmetic circuit 21 outputs a large voltage, thereby allowing a voltage to occur in the capacitor $C_{11}$. As the voltage applied to the discharge lamp becomes larger, the lamp lighting detecting circuit 14 operates, and has a low output. Thus, the control circuit 8 is operated so as to initiate the discharge. When the discharge lamp 5 is lit, the output of the lamp lighting detecting circuit 14 is given to the capacitor $C_{50}$ through the buffer circuit BU1 and diode $D_{14}$, thereby charging the capacitor $C_{50}$. When the discharge lamp 5 is extinguished, the voltage of the capacitor $C_{50}$ is discharged through the resistance $R_{90}$, and diminishes as time goes on. The voltage of the capacitor $C_{50}$ is given to the inversion circuit OP10, whereby the inversion is effected and amplified. Since at the input terminal of the inversion circuit OP10 the minus (−) bias voltage VB1 and the voltage of the capacitor $C_{50}$ are added, the output of the inversion circuit OP10 becomes positive (+) at the extinction, and is clipped so as to increase proportionally for the extinct period of time. As a result, the initiating current becomes larger as long as extinction lasts. When extinction lasts for a short period of time, the gaseous pressure in the lamp is still high, thereby maintaining the ignition efficiency. In addition, because little confined metal sticks to the wall of the lamp, no large current is required to reinitiate the discharge. However, when extinction lasts for a long time, the gaseous pressure in the lamp drops or the confined metal sticks to the inside wall of the lamp, thereby requiring a large initiation current. This ensures the stabilized lighting immediately after reinitiation.

EXAMPLE 7

Figure 13:
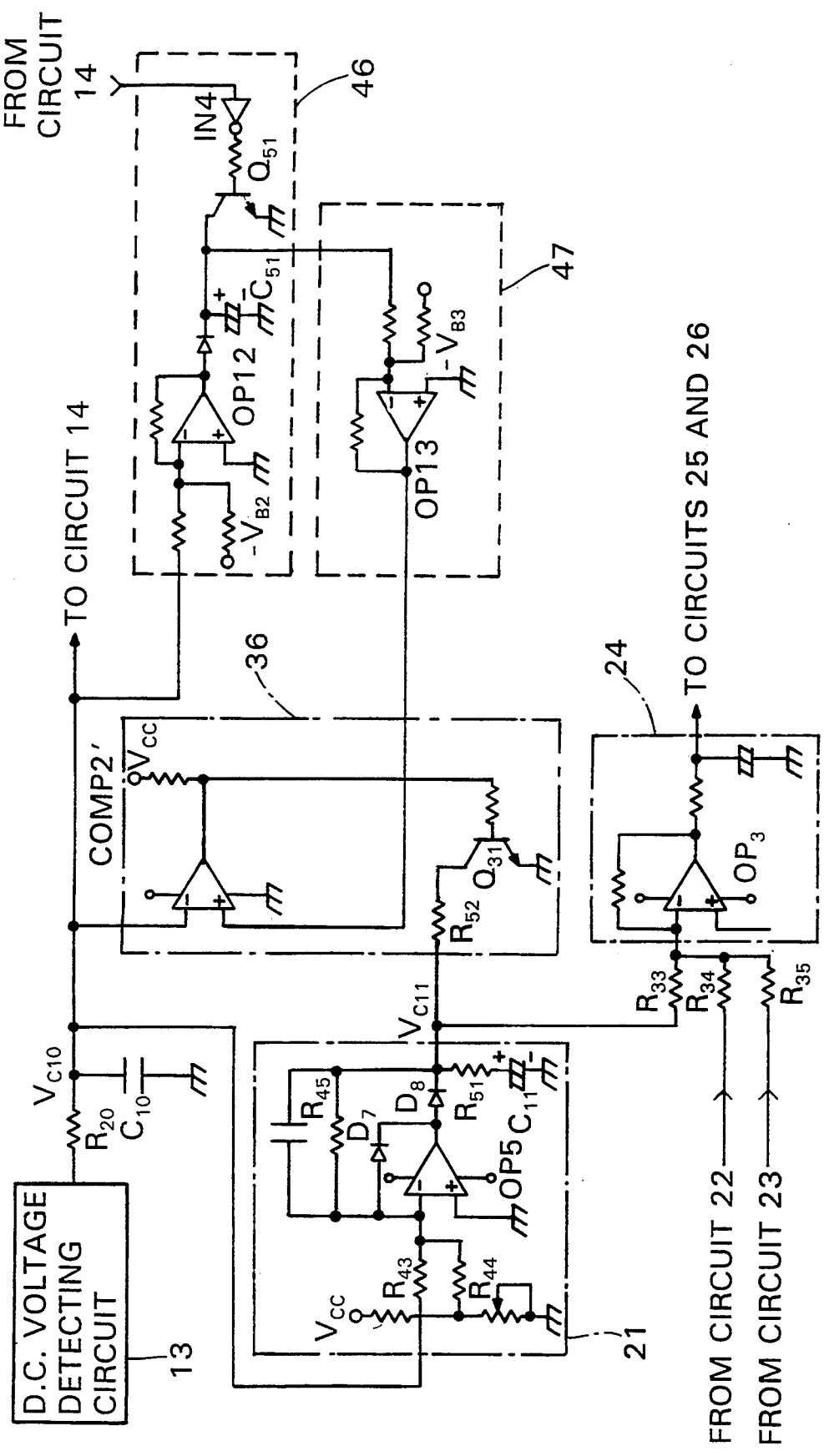
FIG. 13 is a diagram of another modified lamp current arithmetic circuit used in the lamp control circuit.

Referring to FIG. 13, a modified version of the embodiment shown in FIG. 8 will be described:

Instead of the time constant shift circuit 36 and the series connection of the resistances $R_{53}$ and $R_{54}$, a minimum lamp voltage detecting circuit 46 and a shift voltage set-up circuit 47 are provided. The circuit 46 includes an inversion circuit OP12 whose input terminal is connected to the output terminal of the d.c. voltage detecting circuit 13 which outputs a voltage corresponding to the lamp voltage, a capacitor $C_{51}$ connected to the output terminal of the inversion circuit OP12 through the diode, and a transistor $Q_{51}$ whose base is connected to the lamp lighting detecting circuit 14 through the inverter IN4. The collector of the transistor $Q_{51}$ is connected to the capacitor $C_{51}$, and the emitter of it is grounded. Thus, when the transistor $Q_{51}$ is on, the charge in the capacitor $C_{51}$ is discharged.

The shift voltage set-up circuit 47 includes the inversion circuit OP13 for inverting the voltage of the capacitor $C_{51}$ in the minimum lamp voltage detecting circuit 46. The output of the inversion circuit 46 is input to the non-inverted side of the comparator COMP2 as a reference voltage for the comparator COMP2' in the time constant shift circuit 36.

An example of the operation will be described, in which like components and elements to those in FIG. 8 will be omitted for simplicity:

The minimum lamp voltage detecting circuit 46 receives an input corresponding to the lamp voltage, and the received voltage is reversed and amplified by the inversion circuit OP12. A minus bias voltage (−) $V_{B2}$ is added to the input voltage of the inversion circuit OP12 so that the circuit OP13 receives a higher plus (+) voltage when the minimum lamp voltage is low. The output of the inversion circuit OP12 is input to the capacitor $C_{51}$ through the diode. The lower the minimum lamp voltage is, the higher the output voltage of the inversion circuit OP13 becomes. At the initiation of discharge the transistor $Q_{51}$ is on by the inversion circuit IN4, thereby discharging the charge in the capacitor $C_{51}$. Thus the voltage of the capacitor $C_{51}$ has a value corresponding to the post-initiation minimum lamp voltage. The voltage of the capacitor $C_{51}$ is input to the inversion circuit OP13, and is reversed and amplified by the inversion circuit OP13. A minus (−) bias voltage $-V_{B3}$ is added to the output voltage of the inversion circuit OP13 so that the inversion circuit OP13 outputs a lower plus (+) voltage when the input voltage is higher. As a result, the output voltage of the inversion circuit OP13 outputs a lower voltage when the minimum lamp voltage is lower. When the minimum lamp voltage is low, the reference voltage of the comparator COMP2' becomes low. At the low minimum lamp voltage the transistor $Q_{31}$ is on, and the resistance $R_{52}$ is connected to the ground line. The resistance $R_{52}$ prolongs the time constant required to prevent the lamp current from rising at the increasing lamp voltage. By slowing the time constant down to reduce the lamp current the lamp current is allowed to flow in a prolonged period of time, thereby ensuring that a greater amount of current is allowed to flow through the lamp. In this way, a low minimum lamp voltage prolongs the time constant required to reduce the current, thereby increasing the electric power supplied to the lamp. Thus, the lighting output can rise upward at a constant speed irrespective of irregularities in the minimum lamp voltage.

EXAMPLE 8

Figure 14:
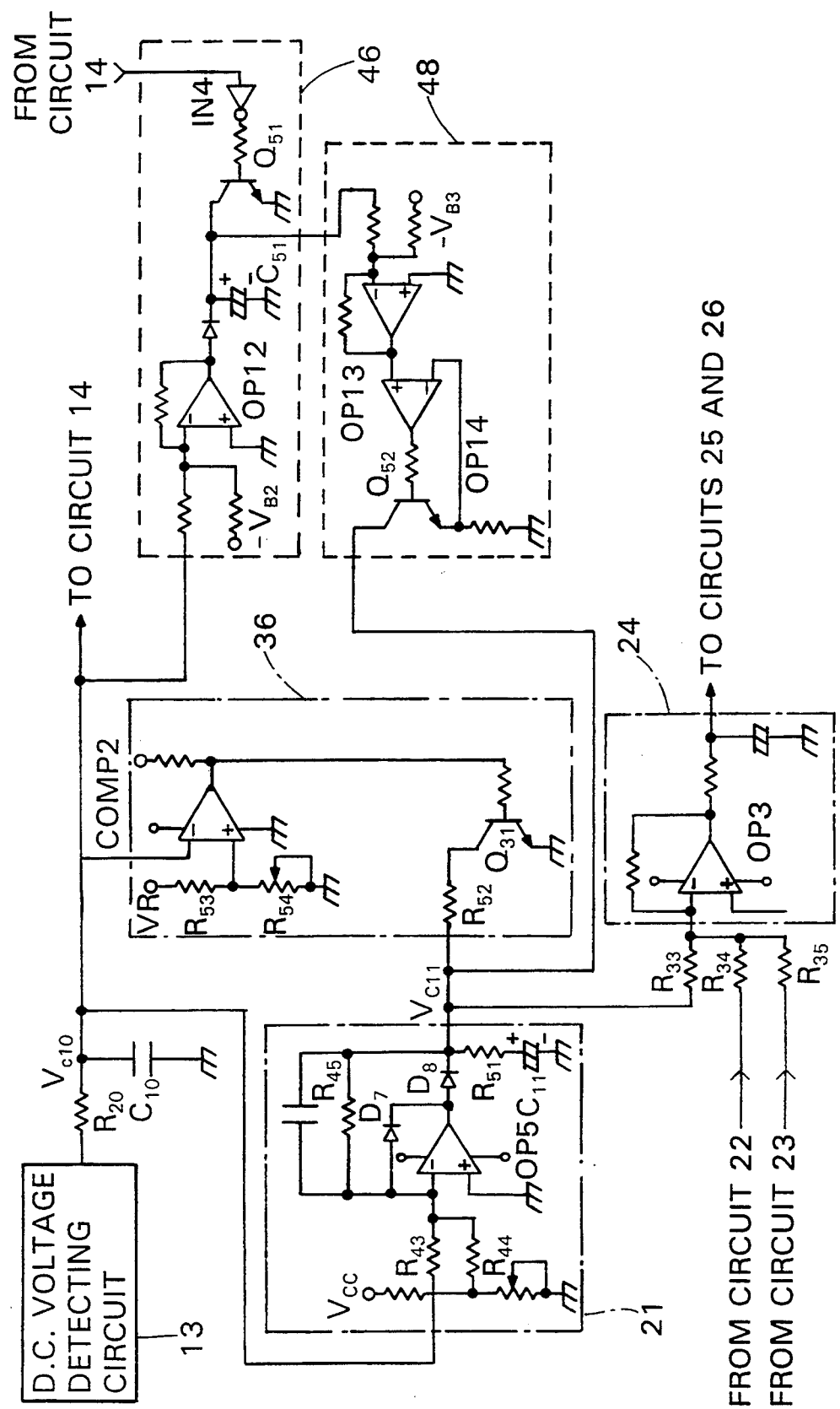
FIG. 14 is a diagram of a further modified lamp current arithmetic circuit used in the lamp control circuit.

Referring to FIG. 14, a modified version of the embodiment shown in FIG. 13 will be described:

This example is different from that shown in FIG. 13, in that the series connection including resistances $R_{53}$ and $R_{54}$ used to set up a voltage for shifting in the time constant shift circuit 36 is operated in the same manner as the example of FIG. 8. More specifically, the time constant is changed in accordance with the post-initiation minimum voltage, instead of the shifting voltage. To this end, a time constant control circuit 48 is connected to the output terminal of the minimum lamp voltage detecting circuit 46. This circuit 48 includes an operational amplifier OP14 for reversing the voltage of a capacitor $C_{51}$ in the minimum lamp voltage detecting circuit 46, and a constant current circuit allowing the amount of a current that corresponds to the voltage of the inversion circuit OP12 to flow to the ground. This circuit 48 includes the operational amplifier OP14, and a transistor $Q_{52}$ which is turned on in response to an output from the operational amplifier OP14. The collector of this transistor $Q_{52}$ is connected to an output of the lamp current summing circuit 21. The emitter of the transistor $Q_{52}$ is grounded. The transistor $Q_{52}$ is turned on at an output voltage of the operational amplifier OP14, and continues to discharge until the output voltage of the operational amplifier OP14 reaches a predetermined value.

An example of the operation will be described, in which the description of like components and elements to those in FIGS. 8 and 11 is omitted for simplicity:

The lower the minimum lamp voltage is, the higher the voltage of the capacitor $C_{51}$ in the minimum lamp voltage detecting circuit 46 becomes. At the initiation of discharge the transistor $Q_{51}$ is turned on by the inverter IN4, and the charge of the capacitor $C_{51}$ is discharged. Eventually the voltage of the capacitor $C_{51}$ has a value corresponding to the post-initiation minimum lamp voltage. This voltage is applied to the inversion circuit OP12 whereby it is reversed and amplified. A minus (−) bias voltage $V_{B2}$ is added to the input voltage of the inversion circuit OP12 so that the inversion circuit OP12 outputs a lower plus (+) voltage when the input voltage is higher. As a result, the output voltage of the inversion circuit OP12 outputs a lower voltage when the minimum lamp voltage is lower. The lower the minimum lamp voltage is, the less current is discharged. when the transistor $Q_{52}$ in the time constant current control circuit 48 is turned on. Thus, the voltage drop of the capacitor $C_{11}$ in the lamp current arithmetic circuit 21 is retarded, thereby prolonging the time constant required to reduce the lamp current by the lamp current summing circuit 21. In this way the time constant is continuously changed on the basis of the minimum lamp voltage, thereby making it possible to prolong a time constant at a low lamp voltage and to reduce the lamp current over a prolonged period of time. As a result, a greater amount of current can be supplied to the lamp for a relatively short period of time. This ensures that at a relatively low minimum lamp voltage the lighting output rises up quickly. Thus, the lighting output can rise up at a constant speed irrespective of irregularities in the minimum lamp voltage.

EXAMPLE 9

Figure 15:
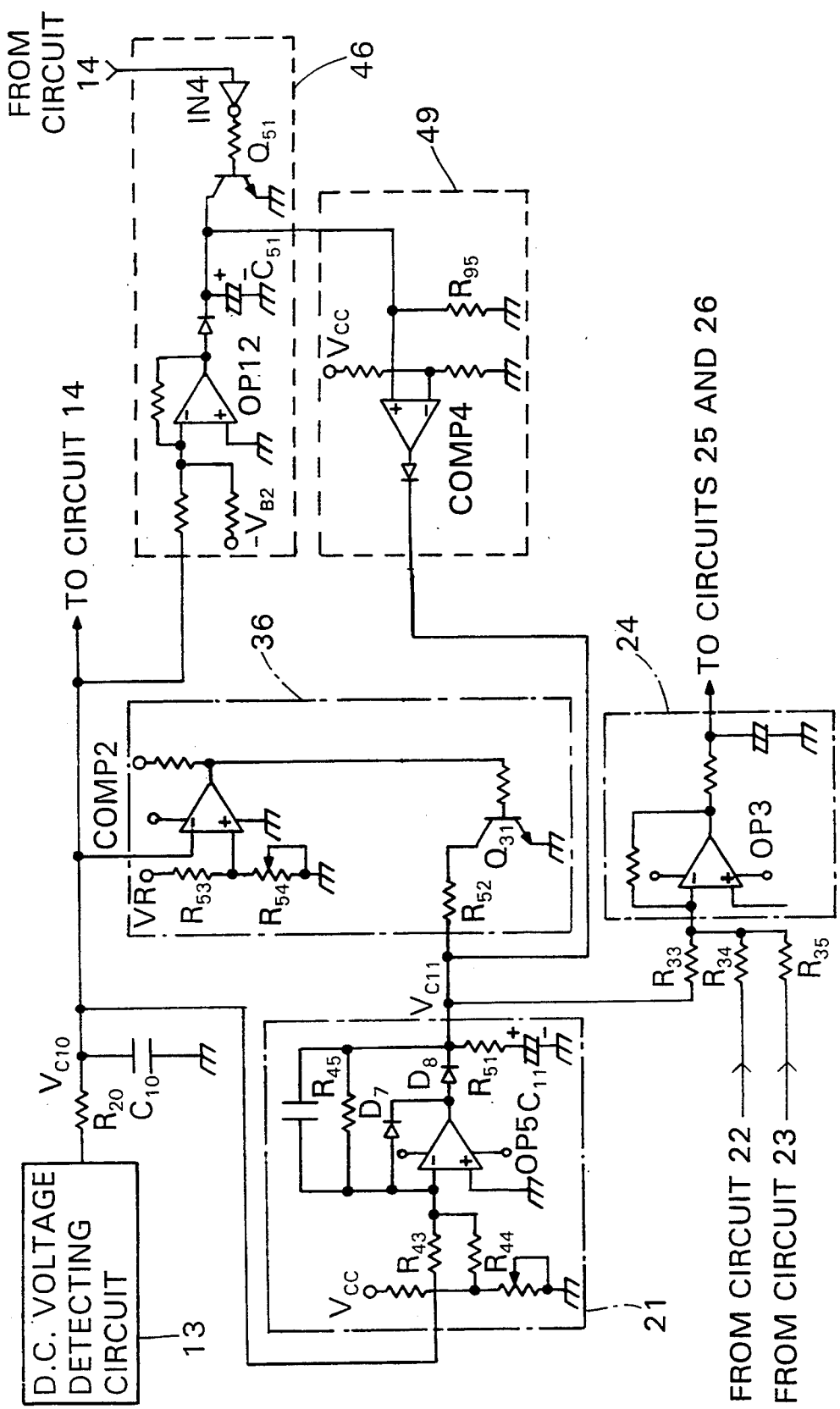
FIG. 15 is a diagram of a still further modified lamp current arithmetic circuit used in the lamp control circuit.

Referring to FIG. 15, a modified version of the embodiment shown in FIG. 14 will be described:

This example is different from that shown in FIG. 14, in that instead of changing a time constant, a maximum lamp current is changed so as to change the time for which a maximum lamp current is supplied to the lamp. To this end, a maximum lamp current time set-up circuit 49 (hereinafter called "maximum lamp current set-up circuit") is provided. This maximum lamp current set-up circuit 49 includes a resistance $R_{95}$ for discharging the voltage of the capacitor $C_{51}$ in the minimum voltage detecting circuit 46 to the ground, and a comparator COMP4 for increasing the output of the lamp current summing circuit 21.

Figure 16:
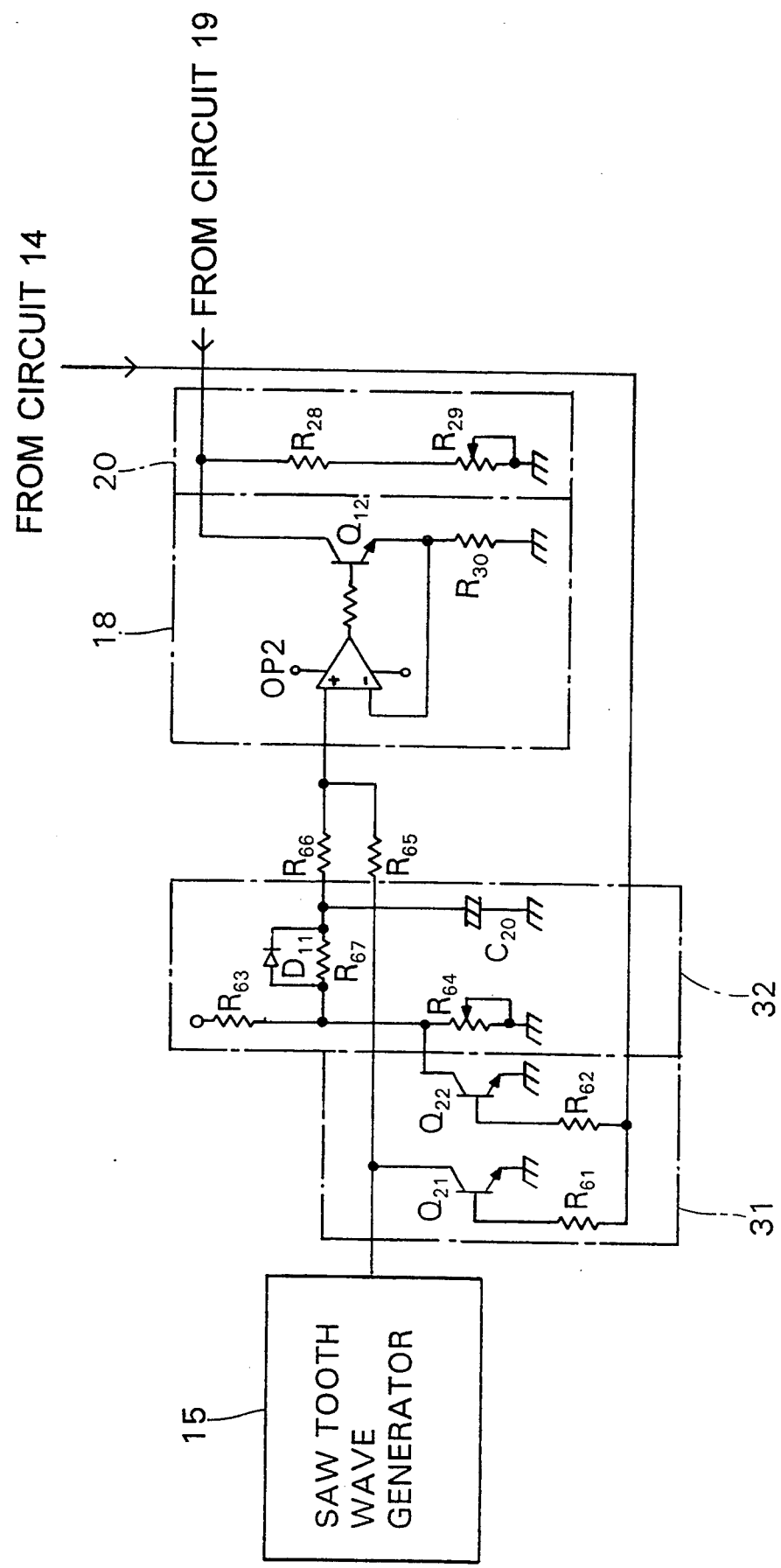
FIG. 16 is a diagram of a further modified lamp control circuit.

An example of the operation will be described, in which the description of like components and elements to those in FIGS. 8, 15 and 16 is omitted for simplicity:

The lower the minimum lamp voltage becomes, the higher the voltage of the capacitor $C_{51}$ in the minimum lamp voltage detecting circuit 46 becomes. At the initiation of discharge, the transistor $Q_{51}$ is turned on by the inverter IN4, thereby discharging the charge of the capacitor $C_{51}$ until the voltage thereof has a value corresponding to the post-initiation minimum lamp voltage. After the voltage of the capacitor $C_{51}$ has reached the minimum lamp voltage, it reduces in accordance with the releasing of the charge of the capacitor $C_{51}$ through the resistance $R_{95}$. The comparator COMP4 compares between the voltage of the capacitor $C_{51}$ and the reference voltage, and the output voltage is kept high until the voltage of the capacitor $C_{51}$ becomes equal to the reference voltage. This output voltage is added to the output of the lamp current arithmetic circuit 21, and therefore the voltage of the capacitor $C_{11}$ in the lamp current arithmetic circuit 21 becomes high. While the output of the comparator COMP4 is kept high, the lamp current arithmetic circuit 21 regulates the lamp current so as to be the maximum lamp current. Thus the maximum lamp current is allowed to flow through the discharge lamp 5 over a relatively long period of time. In this way, the lower the minimum lamp voltage is, the longer the maximum current is allowed to flow through the discharge lamp 5. As a result, the discharge lamp receives a large supply of current for a relatively short period of time. This ensures that at a relatively low minimum lamp voltage the lighting output rises up quickly. Thus, the lighting output can rise up at a constant speed irrespective of irregularities in the minimum lamp voltage.

EXAMPLE 10

Referring to FIG. 16, a modified version of the cut-off circuit and the first bias circuit of FIG. 1 will be described:

This example is characterized in that the frequency of the lamp current is gradually changed over a period of time from the initiation of discharge up to the lighting. The output of the saw tooth wave generator 15 is given to the first constant current circuit 18 through the bias circuit 32. The first constant current circuit 18 is connected to the junction of the terminal $R_T$ of the switching regular control IC 19 and the bias current circuit 20 in the same manner as in the first example.

The cut-off circuit 31 includes transistors $Q_{21}$ and $Q_{22}$ whose bases are connected to the output terminal of the lamp lighting detecting circuit 14 through resistances $R_{61}$ and $R_{62}$. A bias circuit 32 includes a forward bias series connection including a resistance $R_{63}$ and a variable resistor 64, a parallel connection including a resistance $R_{67}$ and a diode $D_{11}$ connected in parallel to the bias point in the forward bias series connection, and a resistance $R_{66}$ connected in series to the parallel connection. The resistance $R_{66}$ is connected to the (+) input terminal of the operational amplifier OP2 in the constant current circuit 18. The capacitor $C_{20}$ is connected to the junction of resistances $R_{67}$ and $R_{66}$, the capacitor $C_{20}$ being charged by a diode $D_{11}$. The output voltage of the saw tooth wave generator 15 is given to the (+) input terminal of the operational amplifier OP2 in the first constant current circuit 18 through a resistance $R_{65}$, and the output of the saw tooth wave generator 15 is added. The collector of the transistor $Q_{21}$ in the cut-off circuit 31 is connected to the output terminal of the saw tooth wave generator 15, and the collector of the transistor $Q_{22}$ is connected to a bias point in the for-bias series connection. The emitters of the transistors $Q_{21}$ and $Q_{22}$ are respectively grounded.

Under this arrangement, when the output of the lamp lighting detecting circuit 14 becomes low, and the transistors $Q_{21}$ and $Q_{22}$ in the cut-off circuit 31 are off thereby initiating the discharge, the bias voltage determined by the for-bias series resistance $R_{63}$ is input to the (+) input terminal of the operational amplifier OP2 in the first constant current circuit 18 with the addition of the output voltage of the saw tooth wave generator 15. The bias voltage is instantaneously applied to the (+) input terminal of the operational amplifier OP2, and is stored in the capacitor $C_{20}$. Then, when the oscillating frequency of the switching regulator control 19 becomes high thereby allowing a current to flow through the discharge lamp at a high resonance frequency. In this way the discharge is initiated, thereby increasing the output of the lamp lighting detecting circuit 14 to a high level. Thus the transistors $Q_{21}$ and $Q_{22}$ in the cut-off circuit 31 are turned on. At this stage, the bias voltage in the bias circuit 32 is not immediately grounded but gradually reduced owing to the fact that the charge of the capacitor $C_{20}$ is discharged through resistances $R_{67}$, $R_{66}$ and $R_{65}$. As a result, the clocks $E_1$ and $E_2$ are prevented from rapidly dropping to a low frequency such as 2 KHz. From the initiation of discharge up to the lighting the frequencies of the clocks $E_1$ and $E_2$ are gradually reduced, thereby avoiding a possible suspension of initiation due to rapid reduction in frequencies.

EXAMPLE 11

Figure 17:
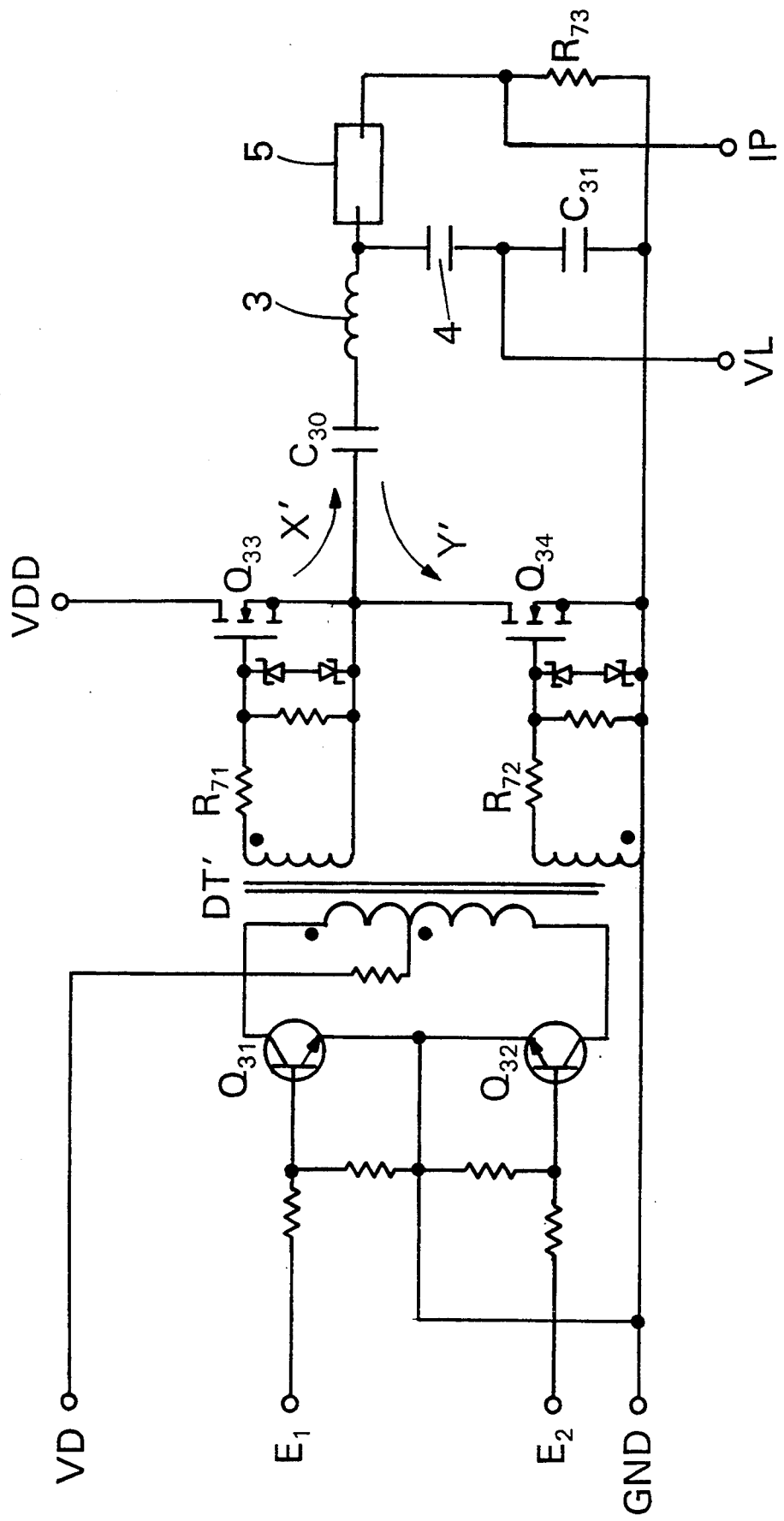
FIG. 17 is a circuit diagram of a modified inverter used in the present invention.

FIG. 17 is a circuit diagram using a series inverter which is driven by a d.c. current. The series inverter has the following structure:

Each end of the primary winding is grounded through drive transistors $Q_{31}$ and $Q_{32}$. The base of each transistor receives clocks $E_1$ and $E_2$ which are reversed so as to effect a phase shift. The primary winding receives a drive voltage VD at its middle point. The secondary side of the drive transformer DT' is provided with two secondary windings. The ends of the secondary windings are connected to the base of switching transistors $Q_{33}$ and $Q_{34}$, respectively, which are connected in series to each other and disposed between a d.c. power source VDD and the ground GND. The ends of the secondary windings of the drive transformer DT' are connected to the junction of the switching transistors $Q_{33}$ and $Q_{34}$ and the ground line. A current reversing capacitor $C_{30}$, a choke coil 3, an resonance capacitor 4, and a voltage detecting capacitor $C_{31}$ are connected in series between the junction of the switching transistors $Q_{33}$ and $Q_{34}$ and the ground line. A discharge lamp 5 and a resistance $R_{73}$ are connected in series between the junction of the choke coil 3 and the capacitor 4 and the ground line. The capacitance of the capacitor $C_{30}$ is larger than that of the capacitor 4. The junction of the capacitors 4 and $C_{31}$ constitutes a lamp voltage detecting terminal VL, and the junction of the discharge lamp 5 and a resistance $R_{73}$ constitutes a lamp instantaneous current value detecting terminal IP.

Under this arrangement, when the switching transistor $Q_{33}$ is turned on, the switching transistor $Q_{34}$ becomes off, thereby allowing a current to flow in the direction X' from the d.c. power source, and is supplied to the resonance circuit through the capacitor $C_{30}$, the resonance circuit being constituted by a series connection of the choke coil 3 and the capacitor 4. When the switching transistor $Q_{33}$ is turned off, the switching transistor $Q_{34}$ becomes on, thereby allowing the charge stored in the capacitor $C_{30}$ to flow in the direction Y' and be supplied to the resonance circuit. Then, the same operation as in the first example takes place, and the discharge lamp is lit. the lamp voltage is detected through the lamp voltage detecting terminal VL. This eliminates the necessity of detecting a potential difference between both ends of the capacitor $C_{31}$, thereby making it unnecessary to use a differential amplifier in the d.c. voltage detecting circuit shown in FIG. 4 (Example 1). A rectifier will be enough. Thus, the circuit is simplified.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for operating a discharge lamp comprising
    a d.c. power source,
    an inverter driven by the d.c. power source, for generating a signal having a predetermined frequency,
    a resonance circuit connected to the inverter, for generating a resonance voltage to superimpose on the signal having the predetermined frequency,
    a discharge lamp connected to the resonance circuit,
    a lamp voltage detection means, connected to the discharge lamp, for detecting a lamp voltage applied to the discharge lamp and generating a first output signal in accordance with the lamp voltage,
    a lamp start control means for receiving the first output signal and generating a control signal to the inverter so as to regulate an oscillation of the inverter during a period of time extending from the start of the discharge lamp until a stable lighting of the discharge lamp is obtained, the oscillation of the inverter being regulated so that a heavy current flows through the discharge lamp when a low voltage is applied to the discharge lamp, and a small current flows through the discharge lamp when a high voltage is applied to the discharge lamp.
    the apparatus for operating a discharge lamp further comprising a lamp current detecting means, connected to the resonance circuit, for detecting a lamp current which flows through the discharge lamp and generating a second output signal in accordance with the lamp current to the lamp start control means,
    the lamp start control means for further receiving the second output signal.

2. An apparatus for operating a discharge lamp as defined in claim 1,
    wherein the lamp start control means includes
    a d.c. voltage detecting means for receiving the first output signal and generating a detecting signal in accordance with the first output signal, and
    a lamp current arithmetic means for receiving the detecting signal,
    wherein the lamp current arithmetic means includes a bias means for generating a bias signal and outputting a third output signal having a predetermined level when the lamp voltage is below a first prescribed value,
    wherein, when the lamp voltage rises above the first prescribed value and remains above the first prescribed value and below a second prescribed value, the level of the third output signal is decreased as the lamp voltage increases,
    wherein the level of the third output signal is zero when the lamp voltage is above the second prescribed value, and
    wherein the oscillation of the inverter is regulated on the basis of the third output signal obtained by comparing the detecting signal with the bias signal and the lamp current is kept constant on the basis of the third output signal.

3. An apparatus for operating a discharge lamp as defined in claim 1,
    wherein the lamp start control means includes a DC voltage detecting means for receiving the first output signal and generating a detecting signal in accordance with the first output signal, and a lamp current arithmetic means for receiving the detecting signal;

wherein the lamp current arithmetic means includes a bias means for generating a bias signal and outputting a third output signal having a predetermined level when the lamp voltage is below a first prescribed value;

wherein, when the lamp voltage rises above the first prescribed value and remains above the first prescribed value and below a second prescribed value, the level of the third output signal is decreased as the lamp voltage increases;

wherein the level of the third output signal is zero when the lamp voltage is above the second prescribed value; and wherein the oscillation of the inverter is regulated on the basis of the third output signal obtained by comparing the detecting signal with the bias signal and power of the lamp is kept constant on the basis of the third output signal.

4. An apparatus for operating a discharge lamp as defined in claim 2, wherein the lamp start control means includes a d.c. current detecting means for receiving the second output signal and generating a second detecting signal in accordance with the second output signal, a second bias means for generating a second bias signal, and a comparator means for generating a fourth output signal, the fourth output signal being obtained by comparing at least one of the third output signal, the second bias signal and the second detecting signal with another of them, and wherein the oscillation of the inverter is regulated on the basis of the fourth output signal.

5. An apparatus for operating a discharge lamp as defined in claim 2, wherein the lamp start control means includes a time constant shift means, for receiving the detecting signal and changing a time constant when the lamp voltage exceeds a third prescribed value to decrease the lamp current, an output of the time constant shift means being connected to an output of the lamp current arithmetic means.

6. An apparatus for operating a discharge lamp as defined in claim 2, wherein the lamp start control means includes a start voltage timer means for starting a timer operation when the oscillating frequency of the inverter reaches at second prescribed value and for stopping the oscillation of the inverter when the inverter oscillates at a frequency which is higher than the second prescribed value over a prescribed period of time.

7. An apparatus for operating a discharge lamp as defined in claim 1, wherein the lamp start control means includes a lamp instantaneous current value detecting means for receiving the second output signal and generating a third detecting signal when an instantaneous value of the lamp current exceeds a fourth prescribed value, and a control means for receiving the third detecting signal and regulating the oscillation of the inverter in accordance with the third detecting signal.

8. An apparatus for operating a discharge lamp as defined in claim 2, wherein the lamp start control means includes a start current timer means for receiving the third output signal, and wherein the start current timer means, in a period of time extending from the start of discharge until the stable lighting of the discharge lamp is obtain, perform a timer-operation in the duration in which a value of the lamp voltage is lower than the first prescribed value and stopping the oscillation of the inverter when the lamp voltage is higher than the first prescribed value in a prescribed period.

9. An apparatus for operating a discharge lamp as defined in claim 2, wherein the lamp start control means includes a lamp lighting detecting means for receiving the detecting signal and generating a fourth detecting signal when a value of the detecting signal is larger than a fifth prescribed value and a starting initial current set-up means for receiving the fourth detecting signal and setting up an initial value of the lamp current immediately after the start or restart of discharge, the initial value of the lamp current being larger than a value of the lamp current at the time which the lighting is stabilized.

10. An apparatus for operating a discharge lamp as defined in claim 2, wherein the lamp start control means includes a lamp lighting detecting means for receiving the detecting signal and generating a fourth detecting signal when a value of the detecting signal is larger than a fifth prescribed value, a lamp extinguishing time detecting means for receiving the fourth detecting signal and detecting a period of time lapsing after extinction, and a voltage set-up means for setting up a second initial value of the lamp current in accordance with a fifth detecting signal from the lamp extinguishing time detecting means, the second initial value of the lamp current in a case that the period of time lapsing after extinction is long is greater than that in a case that the period of time lapsing after extinction is short.

11. An apparatus for operating a discharge lamp as defined in claim 2, wherein the lamp start control means includes a lamp lighting detecting means for receiving the detecting signal and generating a fourth detecting signal when a value of the detecting signal is larger than a fifth prescribed value, an output of a second time constant shift means, connected to an output of the lamp current arithmetic means, for receiving the detecting signal, a minimum lamp voltage detecting means for receiving the detecting signal and the fourth detecting signal and generating a sixth detecting signal, the minimum lamp voltage detecting means detecting a minimum value of the lamp voltage after the start or restart of discharge, and a shift voltage set-up means for receiving the sixth detecting signal and generating a fifth output signal to the second time constant shift means, the shift voltage set-up means varying the value of the lamp current so as to raise an electric power supplied to the discharge lamp, the second time constant shift means comparing the detecting signal with the fifth output signal, and wherein a value of the lamp current is larger or the lamp current flows through the discharge lamp a longer time as a value of the lamp voltage detected by the minimum lamp voltage detecting means is smaller.

12. An apparatus for operating a discharge lamp as defined in claim 11,
wherein the shift voltage set-up means varies the lamp voltage so as to change a time constant to vary the value of the lamp current in accordance with the sixth detecting signal, the time constant becomes greater as the lamp voltage detected by the minimum lamp voltage detecting means is lower.

13. An apparatus for operating a discharge lamp as defined in claim 11,
wherein the second time constant shift means varies a second time constant to vary the lamp current in accordance with the sixth detecting signal, the second time constant becoming greater as the lamp voltage detected by the minimum lamp voltage detecting means is lower.

14. An apparatus for operating a discharge lamp as defined in claim 12,
wherein the shift voltage set-up means continuously shifts the time constant over the period of time for which the minimum lamp voltage lowers.

15. An apparatus for operating a discharge lamp as defined in claim 5,
wherein the lamp start control means further includes a lamp lighting detecting means for receiving the detecting signal and generating a fourth detecting signal when a value of the detecting signal is larger than a fifth prescribed value,
a minimum lamp voltage detecting means for receiving the detecting signal and the fourth detecting signal and generating a sixth detecting signal, the minimum lamp voltage detecting means detecting a minimum value of the lamp voltage after the start or restart of discharge, and
a time constant control means for receiving the sixth detecting signal from the minimum lamp voltage detecting means, an output of the time constant control means being connected to the output of the time constant shift means, and wherein the time constant control means varies a period of time causing a maximum lamp current to flow in accordance with the sixth detecting signal from the minimum lamp voltage detecting means, the period of time causing the maximum lamp current to flow being longer as the minimum value of the lamp voltage is lower.

16. An apparatus for operating a discharge lamp comprising
a d.c. power source,
an inverter driven by the d.c. power source, for generating a signal having a predetermined frequency,
a resonance circuit connected to the inverter, for generating a resonance voltage to superimpose on the signal having the predetermined frequency,
a discharge lamp connected to the resonance circuit,
a lamp voltage detection means, connected to the discharge lamp, for detecting a lamp voltage applied to the discharge lamp and generating a first output signal in accordance with the lamp voltage,
a lamp start control means for receiving the first output signal and generating a control signal to the inverter so as to regulate an oscillation of the inverter during a period of time extending from the start of the discharge lamp until a stable lighting of the discharge lamp is obtained, the oscillation of the inverter being regulated so that a heavy current flows through the discharge lamp when a low voltage is applied to the discharge lamp, and a small current flows through the discharge lamp when a high voltage is applied to the discharge lamp,
the inverter starting to oscillate at a frequency which is lower than the predetermined frequency immediately after the d.c. power source is applied to the inverter,
the lamp voltage detecting means detecting the resonance voltage, the resonance voltage having a high frequency superimposed to the voltage having a low frequency,
the lamp start control means varying the oscillating frequency of the inverter from low to high frequency,
the resonance circuit generating a high resonance voltage in response to the predetermined frequency, and
the lamp start control means gradually reducing the oscillating frequency of the inverter when the discharge lamp is started in response to the high resonance voltage generated in the resonance circuit.

17. An apparatus for operating a discharge lamp comprising
a d.c. power source,
an inverter driven by the d.c. power source, for generating a signal having a predetermined frequency,
a resonance circuit connected to the inverter, for generating a resonance voltage to superimpose on the signal having the predetermined frequency,
a discharge lamp connected to the resonance circuit,
a lamp voltage detection means, connected to the discharge lamp, for detecting a lamp voltage applied to the discharge lamp and generating a first output signal in accordance with the lamp voltage,
a lamp start control means for receiving the first output signal and generating a control signal to the inverter so as to regulate an oscillation of the inverter during a period of time extending from the start of the discharge lamp until a stable lighting of the discharge lamp is obtained, the oscillation of the inverter being regulated so that a heavy current flows through the discharge lamp when a low voltage is applied to the discharge lamp, and a small current flows through the discharge lamp when a high voltage is applied to the discharge lamp,
the resonance circuit including a series circuit formed by a choke coil and a first capacitor, the series circuit being connected to a second capacitor,
the discharge lamp being connected to the junction of one end of the choke coil and one end of the second capacitor, and
the capacitance of the first capacitor being larger than that of the second capacitor.

18. An apparatus for operating a discharge lamp as designed in claim 17,
wherein the choke coil comprises
a pair of cores having three leg portions facing each other, and
central leg portions which are opposed to each other with a spacing and provided with a coil.

19. An apparatus for operating a discharge lamp as defined in claim 18, wherein the three leg portions are opposed to each other with a spacing.

* * * * *